United States Patent [19]

Hatono et al.

[11] Patent Number: 5,959,991
[45] Date of Patent: Sep. 28, 1999

[54] CELL LOSS PRIORITY CONTROL METHOD FOR ATM SWITCH AND ATM SWITCH CONTROLLED BY THE METHOD

[75] Inventors: Atsuo Hatono, Yokohama; Tadashi Tamaoki, Yokosuka, both of Japan

[73] Assignee: Hitachi, Ltd., Tokyo, Japan

[21] Appl. No.: 08/733,747

[22] Filed: Oct. 16, 1996

[30] Foreign Application Priority Data

Oct. 16, 1995 [JP] Japan .................................. 7-266815

[51] Int. Cl.$^6$ ....................................................... H04J 3/14
[52] U.S. Cl. ............................................................ 370/395
[58] Field of Search .................................. 370/395, 412, 370/229, 230, 231, 232, 233, 234, 396, 397, 398, 399, 413, 414, 415, 417, 419, 420, 235, 236, 252

[56] References Cited

U.S. PATENT DOCUMENTS 5,280,483  1/1994  Kamoi et al. .......................... 370/234
5,581,544  12/1996  Hamada et al. ........................ 370/253
5,677,907  10/1997  Hamada et al. ........................ 370/253

FOREIGN PATENT DOCUMENTS 4-369139  12/1992  Japan .
6-244858   9/1994  Japan .
7-058775   3/1995  Japan .

OTHER PUBLICATIONS

James A. Bucklew, "Large Deviation Techniques in Decision, Simulation, and Estimation," A Wiley–Interscience Publication, p. 1, undated.

Atsuo Hatono, "A Cell Loss Approximation Method Appliable for ATM Traffic of Which Burst Lengths are Depend on General Distributions," Technical Report of IEICE SSE94–242, pp. 37–42, Mar. 1995.

Israel Cidon, et al., "On Protective Buffer Policies," IEEE Transactions on Networking, vol. 2, No. 3, pp. 240–246, Jun. 1994.

J. F. Meyer, et al., "Dimensioning of an ATM switch with shared buffer and threshold priority," Computer Networks and ISDN Systems 26, pp. 95–108, 1993.

Hideki Satoh, "Cell Priority Control by Variable Threshold Cell Discarding," Technical Report of IEICE SSE 95–113, pp. 25–30, Nov. 1995.

Primary Examiner—Huy D. Vu
Attorney, Agent, or Firm—Antonelli, Terry, Stout & Kraus, LLP

[57] ABSTRACT

A cell loss priority control method for an ATM switch in which degradation of the traffic characteristics of a high priority class or a low priority class is detected, a cell loss probability distribution in a buffer is estimated from the cell traffic characteristics, a buffer threshold value is obtained in accordance with the estimated cell loss probability distribution, and the cell is controlled by using the obtained buffer threshold value which maximizes total traffic throughput of both the high priority class and low priority class.

21 Claims, 25 Drawing Sheets

185 RESPONSE CELL RECEPTION PROCESS

195 RELEASE CELL RECEPTION PROCESS

CELL LOSS PRIORITY CONTROL METHOD FOR ATM SWITCH AND ATM SWITCH CONTROLLED BY THE METHOD

BACKGROUND OF THE INVENTION

1. Field of the Invention

The present invention relates to an ATM switch, and more particularly to a traffic management function in CLP (cell loss priority) control for an ATM switch.

2. Description of the Related Art

If the number of cells incoming to an ATM switch becomes more than an allowable quantity, if a plurality of cells income at the same time, or if a plurality of cells income in a very short time interval, loads of switch resources which process these cells become large. It is therefore necessary to detect a heavy load of switch resources, i.e., a degraded process state and control to receive high priority cells and discard low priority cells.

In a conventional ATM switch which realizes a cell loss priority control function by setting a plurality of threshold values to buffers, after a queue length of cells in the buffer of the ATM switch exceeds a predetermined buffer threshold value, a newly arrived cell of a low priority class (cell of CLP bit=1) is simply discarded as described, for example, in JP-A-4-369139. Although the cell loss probability changes with the cell traffic characteristics, the above conventional cell loss priority control method for an ATM switch simply discards cells without considering the cell traffic characteristics at all.

With the above conventional cell loss priority control method for an ATM switch, if the traffic characteristics degrade more than the designated value, it is impossible to suppress the cell loss probability of not only a low priority class cell but also a high priority class cell (cell of CLP bit=0) equal to or lower than an allowable cell loss probability dependent on the type of media such as voices and data.

Furthermore, the cell loss probability of the high priority class is not independent from the cell traffic characteristics of the low priority class, but is affected by the cell traffic characteristics of a low priority class. Regardless of the above situations, a switching process is presently performed under the cell loss priority control that cells of communication services guaranteeing the cell loss probability equal to or lower than the allowable cell loss probability are assigned the high priority class whereas cells of best effort services or cells affixed with violation tags by UPC (Usage Parameter Control) are assigned the low priority class. Best effort services are described in "Internetworking with TCP/IP" by D. Comer Prentice Hall, vol. 1, 1991. UPC specifications are set forth in CCITT Recommendation I.311, 1990 (B-ISDN general network aspects).

The above reason for this is that the switching process for the cells of best effort services or cells affixed with violation tags is performed only during the period while the switch resources (buffers and output line capacity) are idle, because the cell loss probability of these cells is not guaranteed.

However, with the above conventional cell loss priority control method for an ATM switch, the cell loss probability of communication services guaranteeing the cell loss probability of the high priority class is adversely affected by the cells of best effort services or cells affixed with violation tags by UPC, and the cell loss probability becomes larger than the allowable cell loss probability (refer to FIG. 26).

UPC is a function aiming to maintain the cell loss probability to a certain level for communication services guaranteeing the cell loss probability. In supporting best effort services, if the cell loss probability for communication services guaranteeing the cell loss probability is degraded, this guarantee is lost. This problem associated with conventional techniques is a fatal disadvantage of ATM switches.

In JP-A-7-58775, the buffer threshold value is changed on the assumption that the cell loss probability of the high priority class is independent of fluctuation in the traffic characteristics of the low priority class. However, in practice, the cell loss probability of the higher priority class is affected by fluctuation in the traffic characteristics of the low priority class. Therefore, this method cannot ensure the cell loss probability of the higher priority class.

In JP-A-6-244858, the buffer threshold value is shifted dependent on the number of arrived cells per unit time. However, for ATM switches, even if the numbers of arrived cells per unit time are the same, the cell loss probability of the high priority class is affected if burstiness and burst lengths are different, so that the cell loss probability of the high priority class cannot be ensured.

SUMMARY OF THE INVENTION

It is an object of the present invention to solve the above problems associated with conventional techniques and provide a cell loss priority control method for an ATM switch and an ATM switch controlled by the method, capable of suppressing the cell loss probability equal to or lower than an allowable cell loss probability through adaptive control of the buffer threshold value dependent on the cell traffic characteristics.

In order to achieve the above object, it becomes necessary to achieve a function of estimating from the cell traffic characteristics the distribution of cell loss probabilities in buffers, a function of performing adaptive control of the buffer threshold value by obtaining the buffer threshold value which makes the cell loss probability of the high priority class equal to or lower than the allowable cell loss probability of the high priority class, in accordance with the estimated cell loss probability distribution, and a function of suppressing an income of cells if the buffer threshold value adaptive control function cannot operate sufficiently.

First, a method of achieving the function of estimating the cell loss probability distribution in buffers will be described. According to the large deviation principle as described, for example, in the document: J. A. Bucklew, "Large Deviation Techniques in Decision, Simulation and Estimation", John Wiley & Sons, Inc. (1900), it is known that the distribution of skirts of arbitrary probability distribution satisfying the law of large numbers becomes asymptotically an exponential function. Therefore, the cell loss probability distribution $P_{LOSS}$ of an ATM switch can be approximated by the following expression (1) according to the large deviation principle.

$$P_{LOSS} \approx C_{exp}(-\beta x) \quad (1)$$

C and $\beta$ are a constant determined by the cell traffic characteristics, and x is a queue length. There are several methods of obtaining C and $\beta$, the details of which are given in the embodiments.

Next, a method of realizing the function of performing adaptive control of the buffer threshold value will be described. First, the cell loss probability distribution function f(x) is estimated (refer to FIG. 2) by the following expression (2) when cells of both the high priority and low priority classes are stored in the same buffer.

$$f(x) \approx C_1 \exp(-\beta_1 x) \quad (2)$$

$C_1$ and $\beta_1$ are a constant determined by the cell traffic characteristics of both the classes, and x is an indeterminate constant representing a queue length. This distribution function f(x) drawn on a semilog graph becomes close to a straight line so long as the large deviation principle is effective. Similarly, the cell loss probability distribution function g(x) is then estimated by the following expression (3) when cells of only the high priority class are stored in a buffer.

$$g(x) \approx C_2 \exp(-\beta_2 x) \quad (3)$$

Only $\beta_2$ is a constant determined by the cell traffic characteristics of the high priority class. $C_2$ is an indeterminate constant, and x is an indeterminate constant representing a queue length. This distribution function g(x) drawn on a semilog graph also becomes close to a straight line.

The constant $C_2$ of g(x) is determined by the following expression (4) so that the cell loss probability becomes equal to the allowable cell loss probability $P_h$ of the high priority class when the queue length x becomes equal to the buffer length $x_0$.

$$C_2 \approx P_h \exp(\beta_2 x_0) \quad (4)$$

Therefore, the upper bound distribution $g_s(x)$ of the cell loss probability distribution of the high priority class is given by the following expression (5) (refer to FIG. 27).

$$g_s(x) \approx P_h \exp\{-\beta_2(x - x_0)\} \quad (5)$$

The switch resources have an optimum assignment at an equilibrium point. The equilibrium point is a point at which the total throughput of traffic of both the high priority class and low priority class becomes maximum. Namely, the equilibrium point is a cross point between the cell loss probability distribution function f(x) when cells of both the high priority and low priority classes are stored in the same buffer and the upper bound distribution $g_s(x)$ of the cell loss probability distribution of the high priority class. The cross point on the graph corresponds to a solution of the simultaneous expressions of f(x) and $g_s(x)$. By solving the simultaneous expressions of f(x) and $g_s(x)$, the buffer threshold value $x_b$ is obtained so that the cell loss probability of the high priority class becomes equal to or lower than the allowable cell loss probability. From the expressions (2) and (5), the following equation (6) is satisfied.

$$C_1 \exp(-\beta_1 x_b) = P_h \exp\{-\beta_2(x_b - x_0)\} \quad (6)$$

Then, the buffer threshold value is obtained by the following equation (7).

$$x_b = \frac{\ln(C_1) - \ln(P_h) - \beta_2 x_0}{\beta_1 - \beta_2} \quad (7)$$

With above processes, the switch resources (buffers and output line capacity) are assigned in an optimum manner to the high priority class and low priority class in accordance with the cell traffic characteristics. Therefore, even if the traffic characteristics of the low priority class fluctuates, it is possible to achieve a cell loss priority control method for an ATM switch capable of suppressing the cell loss probability of the high priority class equal to or lower than the allowable cell loss probability.

The ATM switch of this invention has the following circuits achieving the above methods.

(1) A circuit for identifying $C_1$ and $\beta_1$ of the expression (2) in accordance the cell traffic characteristics of both the high priority class and low priority class.
(2) A circuit for identifying $\beta_2$ of the expression (3) in accordance with the cell traffic characteristics of the high priority class.
(3) A circuit for identifying $C_2$ of the expression (4) in accordance with $\beta_2$, buffer length, and the allowable cell loss probability of the high priority class.
(4) A circuit for identifying the buffer threshold of the equation (7) in accordance with $C_1$, $\beta_1$, $\beta_2$, and $C_2$.

First, the cell traffic characteristics of both the high priority class and low priority class are obtained through traffic descriptor declared by an ATM terminal or monitored traffic values.

After the traffic characteristics of both the classes are obtained, the added circuit (1) identifies $C_1$ and $\beta_1$ of the expression (2) with the traffic characteristics. This process corresponds to estimation of the cell distribution function f(x) when cell of both the classes are stored in the same buffer.

After $C_1$ and $\beta_1$ of the expression (2) are identified, the added circuit (2) identifies $\beta_2$ of the expression (3). The added circuit (3) obtains $C_2$ of $g_s(x)$ from the expression (4) in accordance with $\beta_2$, buffer length, and the allowable cell loss probability of the high priority class. These processes correspond to estimation of the upper bound distribution function $g_s(x)$ of the cell loss probability when cells of only the high priority class are stored in a buffer.

After $C_1$, $\beta_1$, $\beta_2$, and $C_2$ are identified, the added circuit (4) calculates the buffer threshold value from the equation (7). This process corresponds to obtaining the equilibrium point which provides an optimum assignment of the switch resources. After the threshold value is calculated from the equation (7), the present buffer threshold value is changed to the buffer threshold value calculated from the equation (7).

With the above processes, the adaptive control function for the buffer threshold value is realized which assigns the switch resources to the high priority class and low priority class in an optimum manner.

As described above, According to the invention, it is possible to achieve an optimum assignment of the switch resources (output line capacity and buffers) through adaptive control of the buffer threshold value, even if the cell traffic characteristics dynamically change. This is the first advantage of the invention.

In the case wherein communication services guaranteeing a cell loss probability are assigned the high priority class and best effort services are assigned the low priority class, it is possible to suppress the guaranteed cell loss probability equal to or lower than the allowable cell loss probability, because the guaranteed cell loss probability of communication services with the high priority class being assigned does not adversely affect the cell of best effort services. This is the second advantage of the invention.

Further, in the case wherein communication services guaranteeing a cell loss probability are assigned the high priority class and cells affixed with a violation tag by the UPC circuit are assigned the low priority class, it is possible to suppress the guaranteed cell loss probability equal to or lower than the allowable cell loss probability, because the guaranteed cell loss probability of communication services with the high priority class being assigned does not adversely affect the cell affixed with the violation tag. This is the third advantage of the invention.

In this case, according to the invention, a false alarm rate (probability of erroneously judging a cell not violating the declared value as a violating cell) can be distributed into the cell loss probability of the low priority class and the cell loss probability of the UPC circuit. For example, if it is necessary to suppress the false alarm rate to $1/10^{10}$ or lower and the cell loss probability of the low priority class without no declared value violation is suppressed to $1/10^5$ or lower, the false alarm rate of the UPC circuit can be relaxed from $1/10^{10}$ to $1/10^5$. It is therefore possible to shorten greatly the dwell time (an integral time required for judging whether cells are not violating the declared values) of the UPC circuit 122 equal to or lower than the threshold level. This is the fourth advantage of the invention.

DETAILED DESCRIPTION OF THE PREFERRED EMBODIMENTS

A cell loss priority control method of this invention comprises the steps of detecting a degraded process state of switch resources and obtaining an optimum buffer threshold value to update the previous buffer threshold value.

There are the following specific methods.

Figure 2:
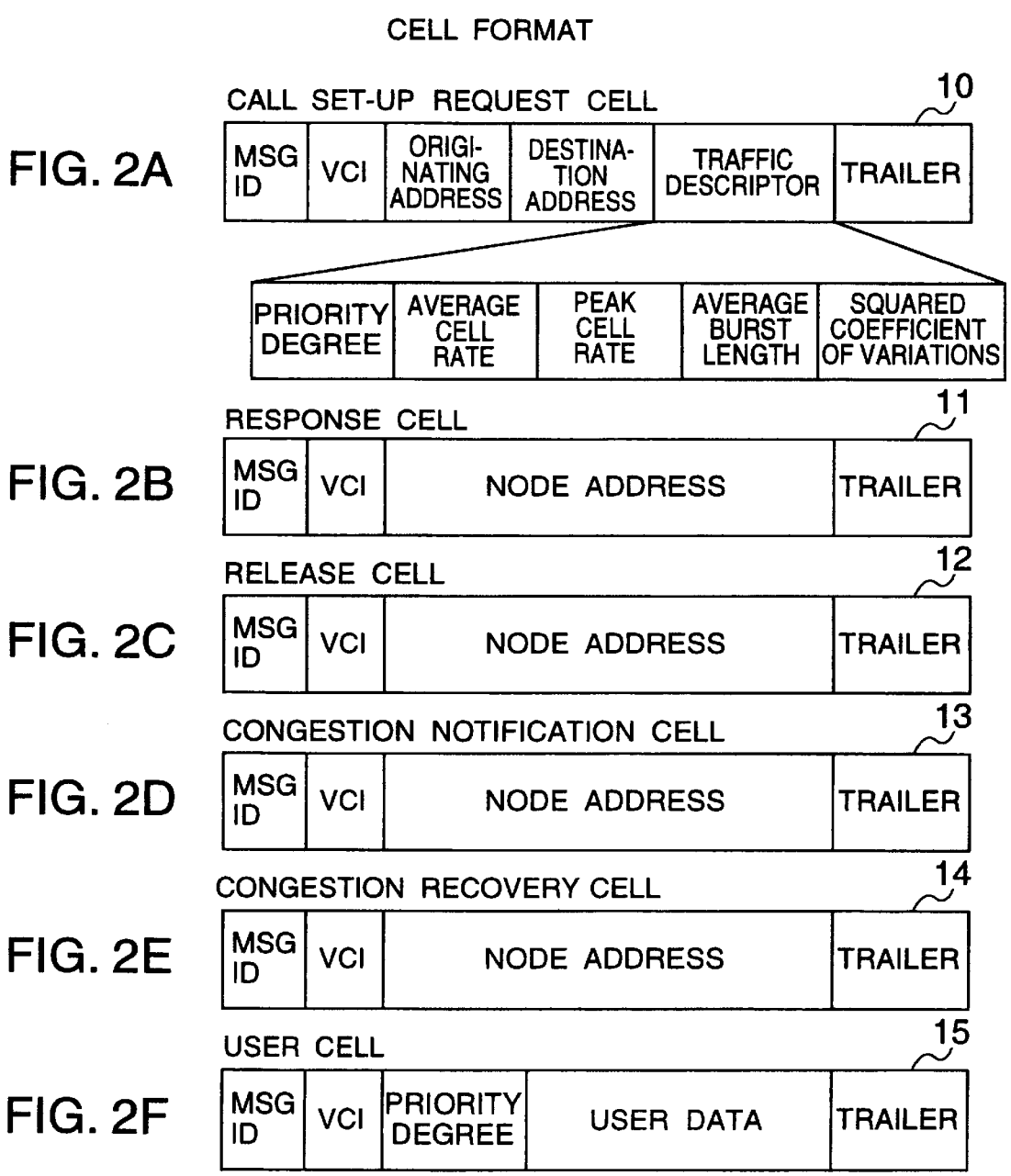
FIGS. 2A to 2F show the formats of various cells used by the ATM network.
Figure 3:
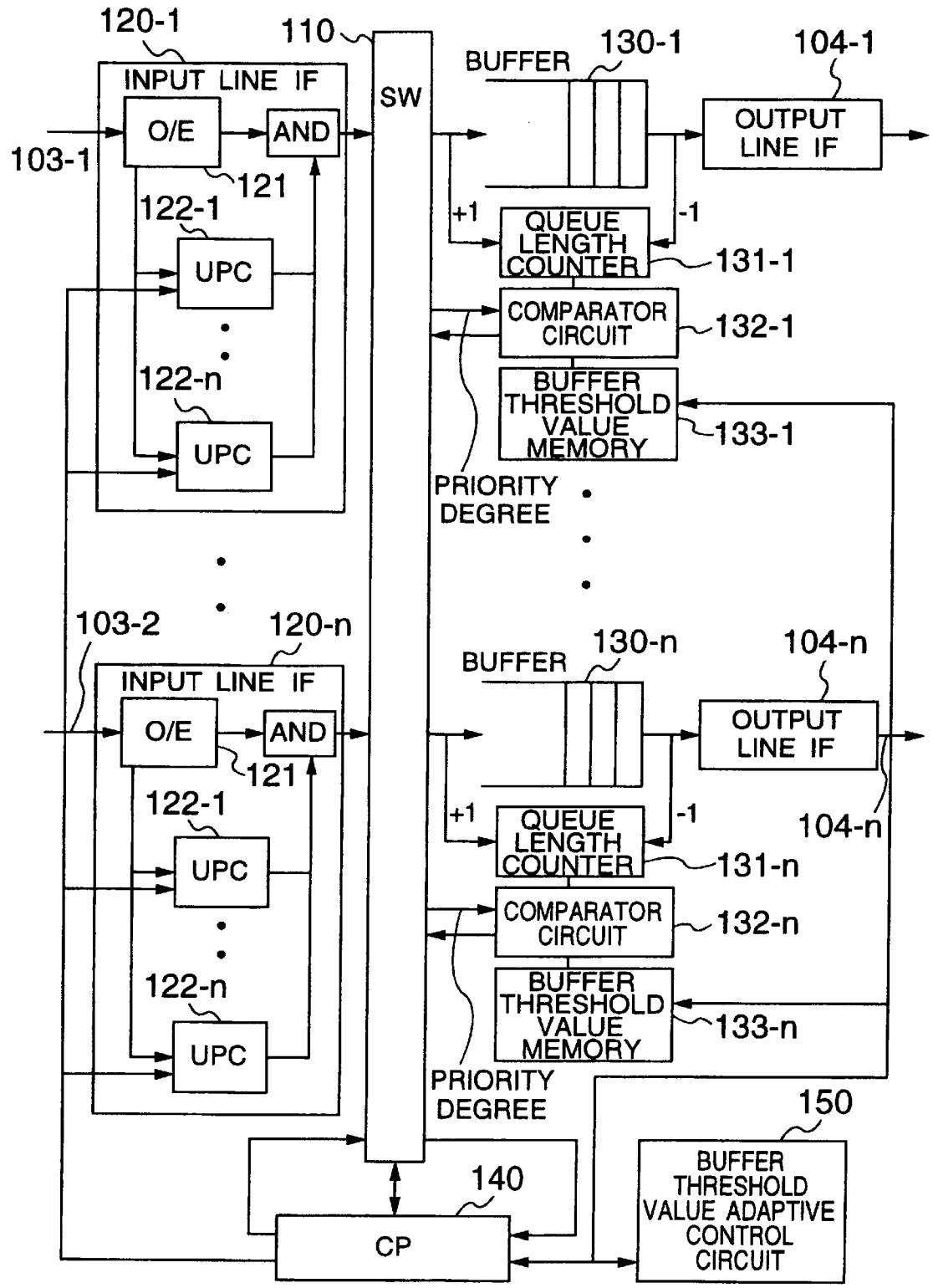
FIG. 3 is a block diagram showing the structure of an ATM switch executing a CAC (Connection Admission Control) process to which the invention is applied.

The first method corresponds to the case wherein a traffic descriptor shown in FIG. 2A is declared by a terminal, and is executed by an ATM switch shown in FIG. 3. With this method, a cell incomes from an input line interface (IF) 120 to a control processor (CP) 140 via a switch 110. CP 140 judges from the contents of the traffic descriptor whether the process state of switch resources has degraded. If it is judged that the process state has degraded, a buffer threshold value adaptive control circuit 150 obtains an optimum buffer threshold value 133 to update the previous threshold value. The optimum buffer threshold value is the value which maximizes throughput of total traffic of priority and low priority classes.

Figure 11:
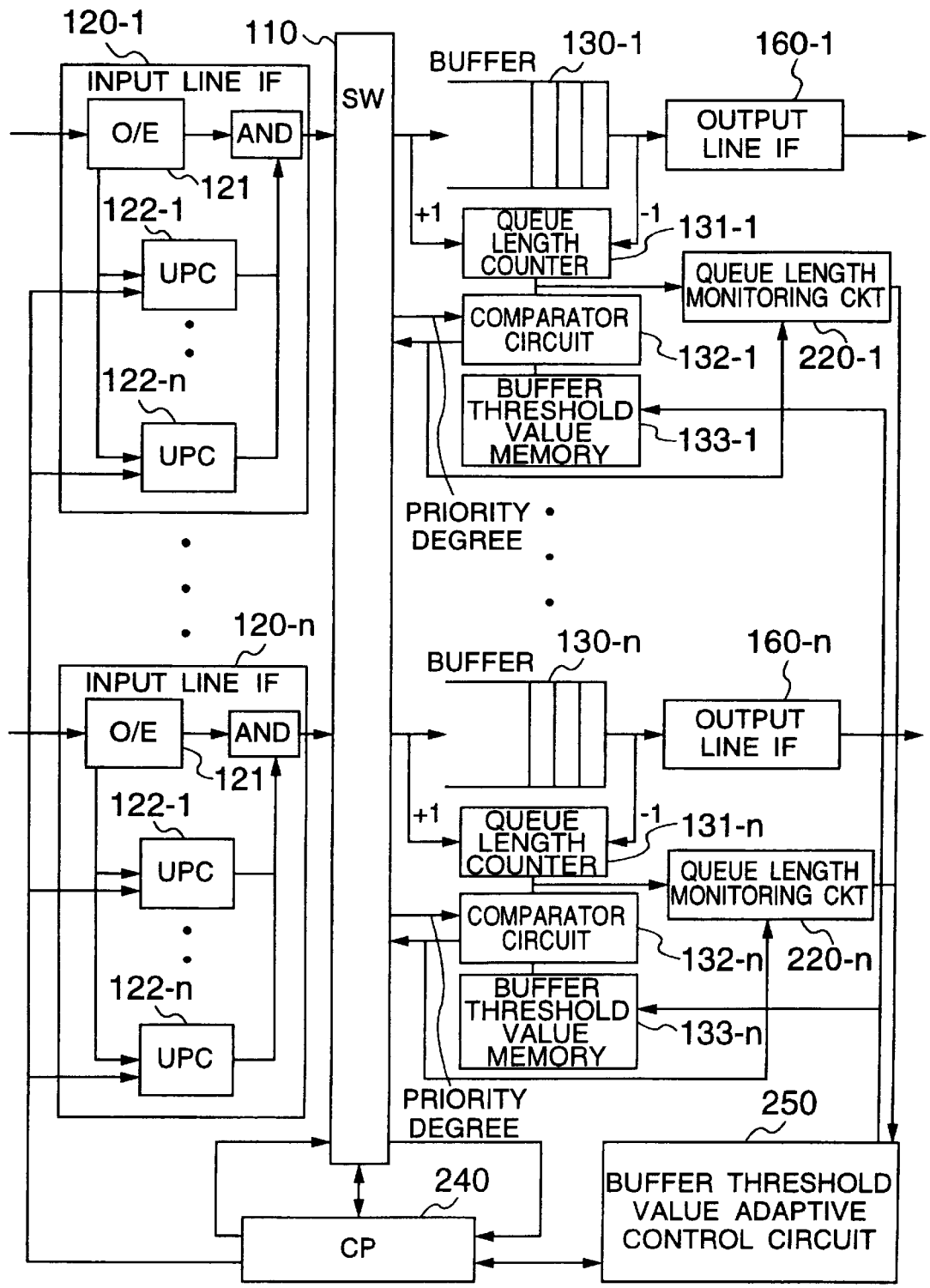
FIG. 11 is a block diagram showing the structure of an ATM switch in which queue lengths in buffers are monitored, according to the present invention.

The second method is executed by an ATM switch shown in FIG. 11. A queue length monitoring circuit 220 monitors whether the cell loss probability has exceeded a designated value. If in excess, a buffer threshold value adaptive control circuit 250 obtains an optimum buffer threshold value 133 to update the previous threshold value.

Figure 19:
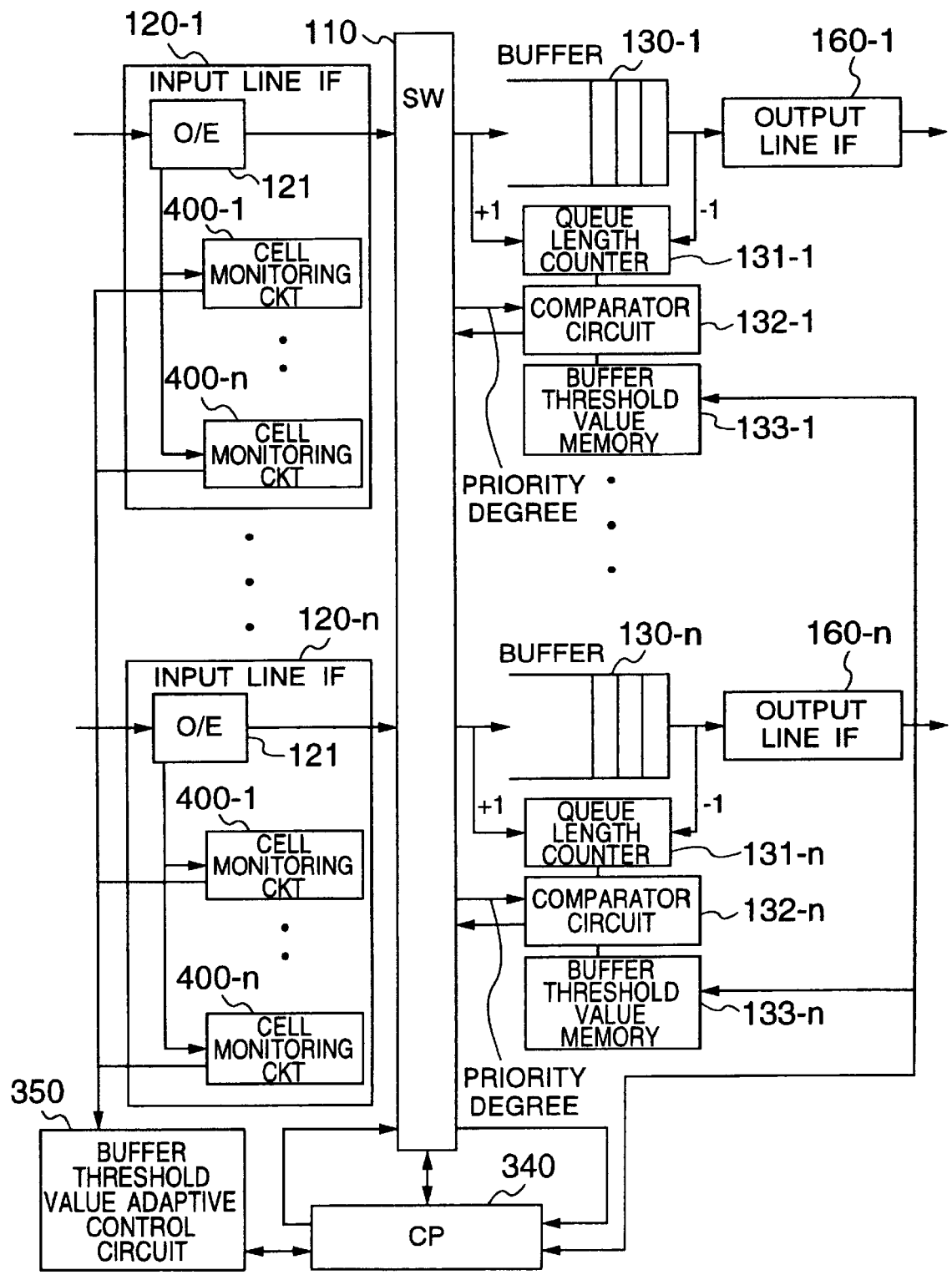
FIG. 19 is a block diagram showing the structure of an ATM switch in which the traffic characteristics of input cells are monitored, according to the present invention.

The third method is executed by an ATM switch shown in FIG. 19. A cell monitoring circuit 400 periodically monitors whether traffic characteristics of incoming cells has exceeded a designated value. If in excess, a buffer threshold value adaptive control circuit 350 obtains an optimum buffer threshold value 133 to update the previous threshold value.

The details of these methods and circuits will be given hereinunder.

Figure 1:
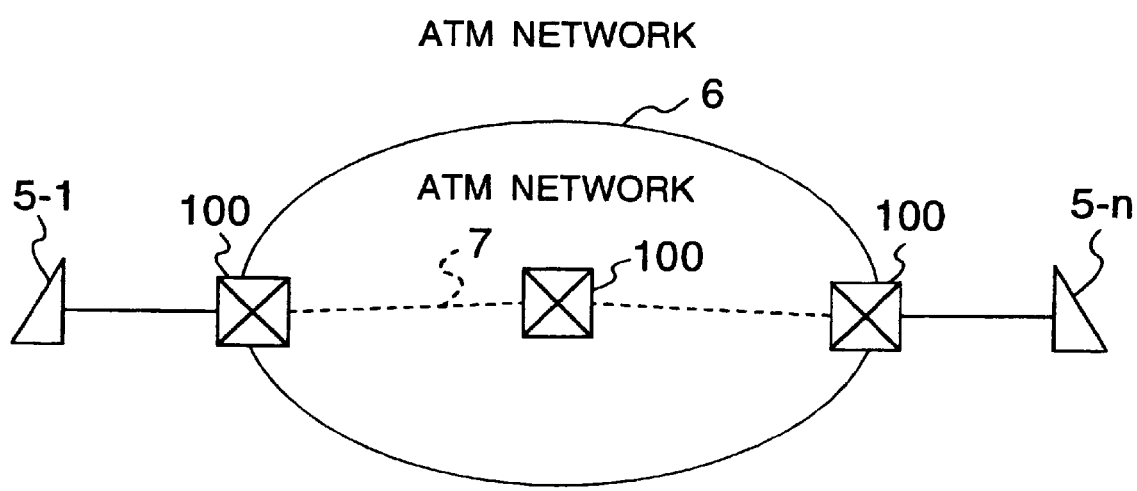
FIG. 1 shows the structure of an ATM (Asynchronous Transfer Mode) network to which the invention is applied.

FIG. 1 shows an ATM network to which the present invention is applied. FIGS. 2A to 2F show cell formats used by the ATM network 6. In any one of the following three embodiments, an ATM switch 100 in the ATM network 6 is achieved which can suppress a cell loss probability of a high priority class equal to or lower than an allowable cell loss probability even if the cell traffic characteristics of a low priority class are degraded, by estimating from the cell traffic characteristics a distribution of cell loss probabilities at buffers and performing adaptive control of buffer threshold values.

First Embodiment

FIG. 3 shows the first embodiment of the invention. An ATM switch 100 of this embodiment can suppress the cell loss probabilities of both the high priority and low priority classes to an allowable cell loss probability or lower, through CAC (Connection Admission Control) using a traffic descriptor declared by each terminal 5 (5-1, 5-2, . . . , 5-n).

In this embodiment, in the ATM network 6 shown in FIG. 1, if a call set-up request is to be issued, each terminal 5 declares an average cell rate, a peak cell rate, a burst length (average or maximum), and a selection between a high priority class a low priority class, for each connection 7. The terminal 5 sends this information to an ATM switch 100 by using a call set-up request cell 10 shown in FIG. 2A. If the terminal 5 requests the average burst length, the ATM switch 100 sets the squared coefficient of variations to "1". If the maximum burst length is declared, it is set to "0". The ATM switch 100 calculates distribution functions of cell loss probabilities of both the high priority and low priority classes, in accordance with the declared average cell rate, peak cell rate, burst length (average or maximum), and a buffer length and output line capacity of the ATM switch 100. In accordance with the calculated distribution functions of cell loss probabilities of both the high priority and low priority classes, the ATM switch 100 calculates a buffer threshold value which makes the cell loss probability of the high priority class equal to or lower than the allowable cell loss probability, after accept of a connection request. If the cell loss probability of the low priority class after the buffer threshold value update becomes equal to or lower than the allowable cell loss probability, the ATM switch 100 admits the connection set-up, whereas if the cell loss probability becomes higher than the allowable cell loss probability, the ATM switch 100 does not admit the connection set-up. With the above operations, the ATM switch 100 of this embodiment can suppress the cell loss probabilities of both the high priority and low priority classes to an allowable cell loss probability or lower.

Principle

First, the approximation theory on a cell loss probability distribution will be described which is used for estimating the cell loss probability at the ATM switch 100. This embodiment is based upon this theory. In this embodiment, cell loss priority control is achieved by using the large deviation principle described earlier and an approximate expression of cell loss probability distribution. This expression is derived from an extension to heterogeneous traffic described in a document "Atsuo HATONO: A Cell Loss Approximation Method Applicable for ATM Traffic of which Burst Lengths are Depend on General Distribution:

Technical Report, Switching System Study Group of IEICE: SSE94-242(1995-03)".

According to this document, if the burst length is general distribution other than exponential distribution and the burst interval is in conformity with exponential distribution, the cell loss probabilities at the buffer of both the high priority and low priority classes can be approximated by the following approximate expression (8) irrespective of with or without cell loss priority control.

$$P_{Loss} \approx \alpha_0\{0.4\exp(-3\beta_0 x) + 0.6\exp(-\beta_0 x)\} + \alpha\{0.4\exp(-3\beta x) + 0.6\exp(-\beta x)\} \quad (8)$$

In this expression (8), $P_{LOSS}$ represents a cell loss probability of both the classes, x represents a buffer length, $\alpha_0$ represents an output line overflow rate of cell collision of both the classes, $\alpha$ represents an output line overflow rate of burst collision of both the classes, $\beta_0$ represents a parameter of queue fluctuation of cell levels of both the classes, and $\beta$ represents a parameter of queue fluctuation of burst levels of both the classes.

These parameters can be explicitly expressed by the following expressions and equations (9) to (17), by using: four parameters including a cell average rate $<v_i>$, a peak cell rate $v_i$, an inverse $\mu_i$ of average burst length, and squared coefficient $c_i$ of variations of burst length; auxiliary parameters derived from the above four parameters (an effective average cell rate $<v>$, an effective peak cell rate $v$, an effective connection number N, an inverse $\mu_0$ of effective cell length, and an inverse $\mu$ of effective burst length; and an output line capacity V, respectively for each connection i.

$$\alpha_0 \approx (1/2)\left(\sum \langle v_i \rangle / V\right) \quad (9)$$

$$\alpha \approx \left\{\sum_{r \geq V}^{N} {}_N C_r (rv - V)(\langle v \rangle / v)^r (1 - \langle v \rangle / v)^{N-r}\right\} / N\langle v \rangle \quad (10)$$

$$\beta_0 = \frac{\mu_0(1 - \sum \langle v_i \rangle / V)}{\{1 - 1/K\}} \quad (11)$$

$$\beta = \frac{\mu(1 - \sum \langle v_i \rangle / V)}{\{1 - V/\sum v_i\}} \quad (12)$$

$$\langle v \rangle = \frac{\sum \langle v_i \rangle (v_i - \langle v_i \rangle)}{\sum (v_i - \langle v_i \rangle)} \quad (13)$$

$$v = \frac{[\sum \langle v_i \rangle (v_i - \langle v_i \rangle)][\sum v_i]}{[\sum (v_i - \langle v_i \rangle)][\sum \langle v_i \rangle]} \quad (14)$$

$$N = \frac{[\sum (v_i - \langle v_i \rangle)][\sum \langle v_i \rangle]}{[\sum \langle v_i \rangle (v_i - \langle v_i \rangle)]} \quad (15)$$

$$\frac{1}{\mu_0} = \frac{\sum \langle v_i \rangle (1 - \langle v_i \rangle / V_n)(1 - v_i / V)}{2(\sum \langle v_i \rangle)} \quad (16)$$

$$\frac{1}{\mu} = \frac{\sum \{\langle v_i \rangle (1 - \langle v_i \rangle / v_i)(1 + c_i) / 2\mu_i\}}{\sum \langle v_i \rangle} \quad (17)$$

In the expressions and equations (9) to (17), the symbol $\Sigma$ means a sum for all connections, and r in the approximate represents an index for sum and takes the values from (v/V) to N. In the equation (11), k represents the number of total connections, and in the equation (17), $(1+c_i)/2\mu_i$ represents an average survival time.

The expression (8) can be asymptotically expressed by the following approximate expression (18) if the buffer length x is sufficiently long.

$$P_{LOSS} \approx 0.6\alpha \exp(-\beta x) \tag{18}$$

By comparing the expressions (2) and (18), $C_1$ and $\beta_1$ can be determined from the traffic characteristics of both the classes.

$$C_1 = 0.6\alpha \tag{19}$$

$$\beta_1 = \beta \tag{20}$$

If the burst length is general distribution other than exponential distribution and the burst interval is exponential distribution, the cell loss probability of the high priority class at the buffer is approximated by the following expression (21).

$$Q_{Loss} \approx \chi_0\{0.4\exp(-3\gamma_0 x) + 0.6\exp(-\gamma_0 x)\} + \chi\{0.4\exp(-3\gamma x) + 0.6\exp(-\gamma x)\} \tag{21}$$

In the expression (21), $Q_{LOSS}$ represents a cell loss probability of the high priority class, x represents a buffer length, $\chi_0$ represents an output line overflow rate of cell collision of the high priority class, $\chi$ represents an output line overflow rate of burst collision of the high priority class, $\gamma_0$ represents a parameter for queue fluctuation of cell levels of the high priority class, and $\gamma$ represents a parameter for queue fluctuation of burst levels of the high priority class.

These parameters can be explicitly expressed by the following expressions and equations (22) to (30), by using: four parameters including an average rate $<v_i>$, a peak cell rate $v_i$, an inverse $\mu_i$ of average burst length, and squared coefficient $c_i$ of variations of burst length; auxiliary parameters derived from the above four parameters (an effective cell average rate $<v'>$, an effective peak cell rate $v'$, an effective connection number $N'$, an inverse $\mu'_0$ of effective cell length, and an inverse $\mu'$ of effective burst length; and an output line capacity V, respectively for each connection i of the high priority class.

$$\chi_0 \approx (1/2)\left(\sum{}' \langle v_i \rangle / V\right) \tag{22}$$

$$\chi \approx \left\{\sum_{rv' \geq V}^{N'} {}_{N}C_r (rv' - V)(\langle v' \rangle / v')^r (1 - \langle v' \rangle / v')^{N'-r}\right\} / N'\langle v' \rangle \tag{23}$$

$$\gamma_0 = \frac{\mu'_0 (1 - \sum{}' \langle v_i \rangle / V)}{\{1 - 1/K'\}} \tag{24}$$

$$\gamma = \frac{\mu(1 - \sum{}' \langle v_i \rangle / V)}{\{1 - V/\sum{}' v_i\}} \tag{25}$$

$$\langle v' \rangle = \frac{\sum{}' \langle v_i \rangle (v_i - \langle v_i \rangle)}{\sum{}' (v_i - \langle v_i \rangle)} \tag{26}$$

$$v' = \frac{[\sum{}' \langle v_i \rangle (v_i - \langle v_i \rangle)][\sum{}' v_i]}{[\sum{}' (v_i - \langle v_i \rangle)][\sum{}' \langle v_i \rangle]} \tag{27}$$

$$N' = \frac{[\sum{}' (v_i - \langle v_i \rangle)][\sum{}' \langle v_i \rangle]}{[\sum{}' \langle v_i \rangle (v_i - \langle v_i \rangle)]} \tag{28}$$

$$\frac{1}{\mu'_0} = \frac{\sum{}' \langle v_i \rangle (1 - \langle v_i \rangle / V_n)(1 - v_i / V)}{2(\sum{}' \langle v_i \rangle)} \tag{29}$$

$$\frac{1}{\mu'} = \frac{\sum{}' \{\langle v_i \rangle (1 - \langle v_i \rangle / v_i)(1 + c_i)/2\mu_i\}}{\sum{}' \langle v_i \rangle} \tag{30}$$

In the expressions and equations (22) to (30), the symbols $\Sigma'$ sum for all connections of the high priority class, and k' represents the number of total the high priority class.

The expression (21) can be asymptotically expressed by the following approximate expression (31) if the buffer length x is sufficiently long.

$$P_{Loss} \approx 0.6\chi \exp(-\gamma x) \tag{31}$$

From the expressions (3) and (31), $\beta_2$ can be determined from the traffic characteristics of the high priority class.

$$\beta_2 = \gamma \tag{32}$$

From the equation (7), the buffer threshold value $x_b$ can be given by the following equation (33).

$$x_b = \frac{\ln(0.6\alpha) - \ln(P_h) - \gamma x_0}{\beta - \gamma} \tag{33}$$

From the expression (1), the approximate value $P_L$ of the cell loss probability of the low priority class at this buffer threshold value is calculated by the following expression (34).

$$P_L \approx \alpha_0\{0.4\exp(-3\beta_0 x_b) + 0.6\exp(-\beta_0 x_b)\} + \alpha\{0.4\exp(-3\beta x_b) + 0.6\exp(-\beta x_b)\} \tag{34}$$

From the expressions (5) and (21), the approximate value P of the cell loss probability of the high priority class is given by the following expression (35).

$$P \approx P_L \exp\{-\beta(x_0 - x_b)\} \tag{35}$$

In order to incorporate the large deviation principle, it is necessary that the cell loss probability distribution can be approximated with one exponential function. The range in which the large deviation principle is effective is obtained from the expression (8).

In the expression (8), if the third term contributes sufficiently smaller than the fourth term, the cell loss probability distribution can be approximated by one exponential function. Since $1/e^3 = 0.05$ at $x=1/\beta$, the contribution by the third term is 0.05 of the contribution by the fourth term. In view of this, in this invention, a knee point is defined by a point given by the following equation (36).

$$x = [1/\beta] \tag{36}$$

[ ] means a Gauss symbol, and [a] is a largest integer smaller than a.

Structure (1) Overall Structure (FIG. 3)

FIG. 3 shows an example of the structure of the ATM switch 100 for transmitting a cell to the ATM network after statistical multiplex.

The ATM switch 100 is constituted by a switch circuit 110, an input line interface circuit 120 (120-1, 120-2, . . . , 120-n), a cell buffer 130 (130-1, 130-2, . . . , 130-n), an output line interface (IF) circuit 104 (104-1, 104-2, . . . , 104-n), and a CP (Control Processor) circuit 140. In addition to these components, a queue length counter 131, a comparator circuit 132, and a buffer threshold value memory 133 are added for performing cell loss priority control.

The different point of the ATM switch 100 of this embodiment from a conventional ATM switch is that the buffer threshold value adaptive control circuit 150 is provided in order to suppress the cell loss probability of the high priority class equal to or lower than an allowable cell loss probability even if the cell traffic characteristics of a low priority class are degraded, by estimating from the cell traffic characteristics a distribution of cell loss probabilities at the buffer 130 and performing adaptive control of buffer threshold values.

Of these circuit components, the input line interface circuit 120 is constituted by an optical/electronical (O/E) conversion circuit 121 and an UPC 122 (122-1, 122-2, ..., 122-n) for supervising whether traffic violates the declared values. This O/E circuit 121 performs optical/electronical conversion, and also monitors a peak cell rate, average cell rate, and a maximum burst length declared by the terminal 5 to monitor whether the traffic of the terminal 5 violates the declared values. If any violation is detected, the cell is discarded. The switch circuit 110 performs switching of cells to distribute them among cell buffers 130 provided for respective output lines (104-1, 104-2, ..., 104-n), in accordance with a VCI (virtual Channel Identifier) of a user cell 15 shown in FIG. 2F. The cell buffer 130 performs statistical multiplex to buffer a collision of switched cells. The output line interface circuit 104 (104-1, 104-2, ..., 104-n) sends a cell to the ATM network 6 after electronical/optical (E/O) conversion.

Figure 4:
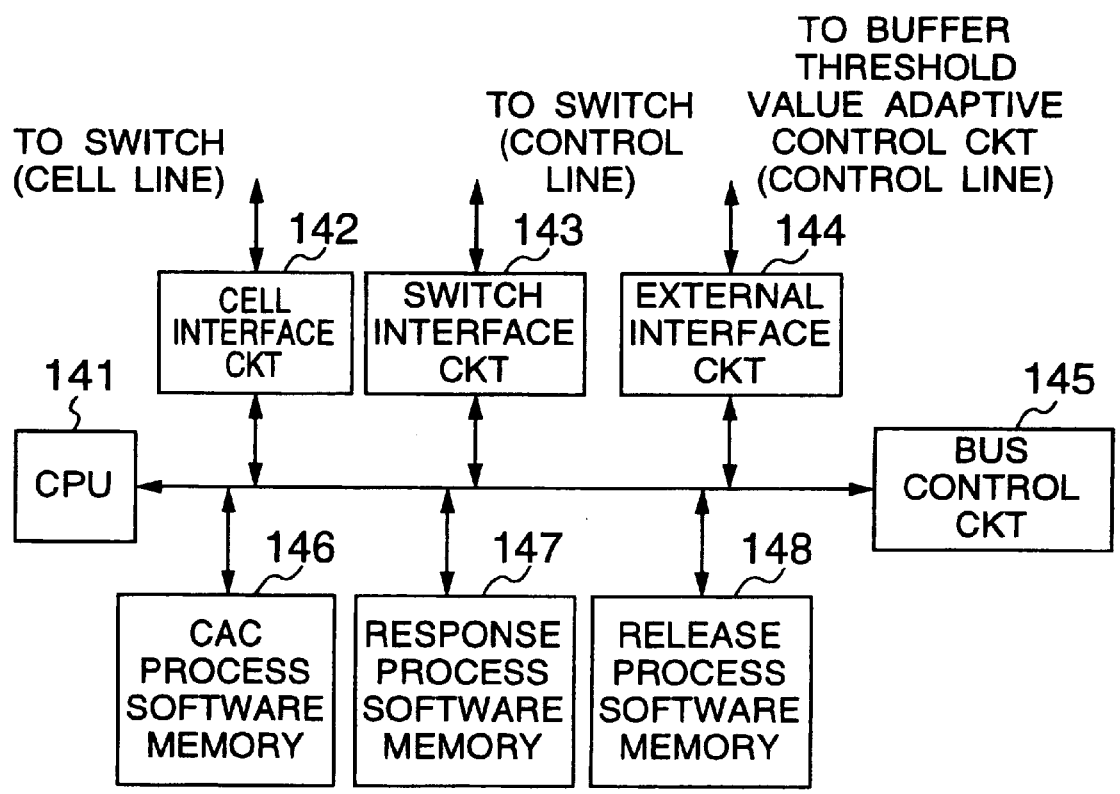
FIG. 4 is a block diagram showing the structure of a CP (Control Processor) circuit of the ATM switch executing the CAC process to which the invention is applied.

The CP circuit 140 is in charge of software processing such as CAC. As shown in FIG. 4, the CP circuit 140 is generally constituted by a CPU (Central Processing Unit) 141, a CAC process software memory 146, a response process software memory 147, a release process software memory 148, a cell interface circuit 142, and a switch interface circuit 143, which are all connected to a bus under control of a bus control circuit 145. In this embodiment, since the buffer threshold value adaptive control circuit 150 is added as shown in FIG. 3, the CP circuit 140 is provided with an external interface circuit 144.

Figure 5:
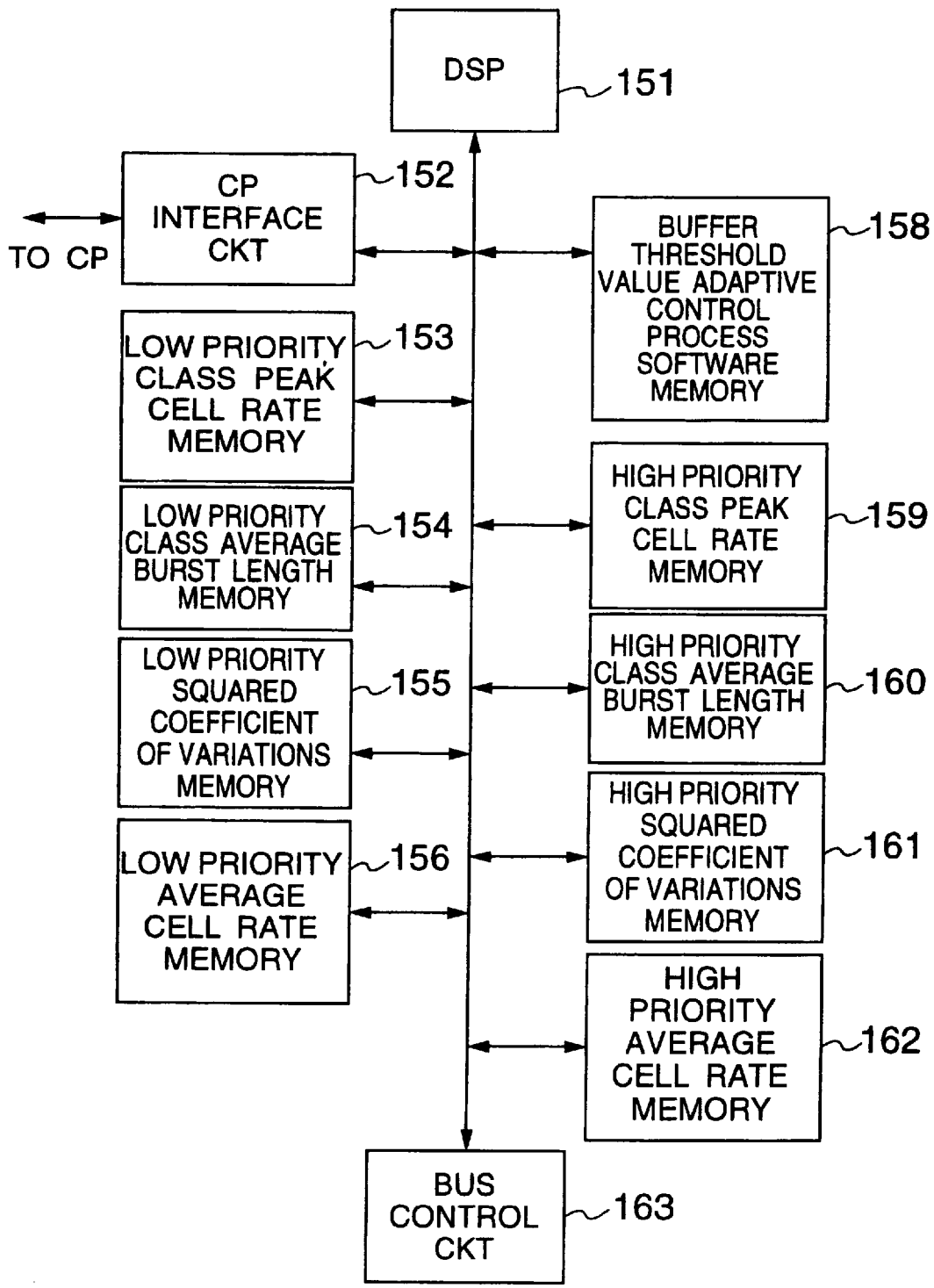
FIG. 5 is a block diagram showing the structure of a buffer threshold value adaptive control circuit of the ATM switch executing the CAC process to which the invention is applied.

(2) Structure of the buffer threshold value adaptive control circuit 150 (FIG. 5).

FIG. 5 shows the structure of the buffer threshold value adaptive control circuit 150. The buffer threshold value adaptive control circuit 150 is constituted by a DSP (Digital Signal Processor), a CP interface circuit 152, a peak cell rate memory 153 of the low priority class, an average burst length memory 154 of the low priority class, a squared coefficient of variations memory 155 of the low priority class, an average cell rate memory 156 of the low priority class, a buffer threshold value adaptive control process software memory 158, a peak cell rate memory 159 of the high priority class, an average burst length memory 160 of the high priority class, a squared coefficient of variations memory 161 of the high priority class, and an average cell rate memory 162 of the high priority class. These components are connected to a bus under control of a bus control circuit 163.

Operation
(1) Outline of Operation

Each suffix of the reference numeral is omitted in the following description. As the user cell 15 flows into the ATM switch 100, the switch circuit 110 performs switching of cells to distribute them among the buffers 130 for respective output lines. At the same time, it turns on a priority signal if CLP bit representative of the high priority degree of the user cell is "0". As the cell enters the buffer 130, the queue length counter 131 counts up by "+1". As the cell is output from the buffer 130, the queue length counter 131 counts down by "−1". The comparator circuit 132 compares the count of the queue length counter 131 with a buffer threshold value in the memory 133. If the count exceeds the threshold value and the high priority signal is off, an enable signal is turned off to instruct the switch circuit 110 to discard the user cell 15 of the low priority class.

(2) CAC Process

Upon reception of a call set-up request cell 10, a response cell 11 (FIG. 2B), a release cell 12 (FIG. 2C) from the ATM terminal 5 or another ATM switch 100, the switch circuit 110 transfers these cells to the CP circuit 140. These control cells transferred to the CP circuit 140 interrupt CPU 141. The interrupted CPU 141 executes a specific process for each type of these control cells.

Figure 6:
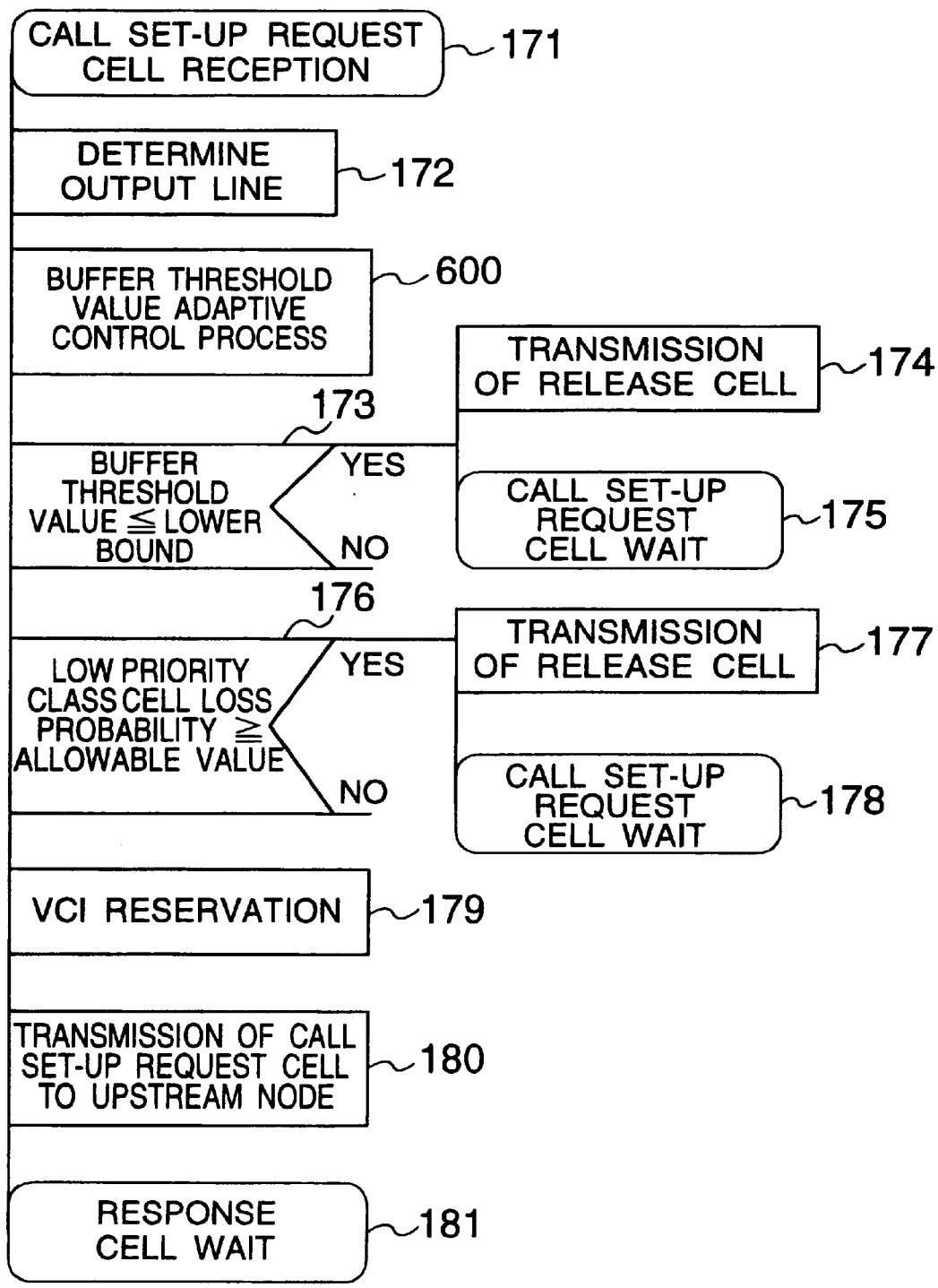
FIG. 6 is a PAD (Problem Analysis Diagram) illustrating the CAC process to be executed, when a call set-up request cell is received, by the CP circuit of the ATM switch to which the invention is applied.

(a) CAC Process 170 (FIG. 6)

FIG. 6 shows the procedure of the CAC process 170. When the call set-up request cell 10 (FIG. 2A) is received (Step 171), an output line corresponding to a destination VCI (Virtual Channel Identifier) is determined (Step 172). After the output line is determined, the CP circuit 140 activates the buffer threshold value adaptive control circuit 150 which inputs the traffic descriptor of the call set-up request cell 10. In accordance with the input traffic descriptor, the buffer threshold value adaptive control circuit 150 returns the buffer threshold value which makes the switch resources (output line capacity and buffers) have an optimum distribution when a connection request for each connection is received. The feature of this invention is adaptive control of a buffer threshold value in the CAC process.

If the buffer threshold value is the lower bound knee point or lower, it is judged that a reception is impossible (Step 173), the release cell 12 is transmitted (Step 174), and the process returns to a call set-up request wait state (Step 175).

If the buffer threshold value is larger than the knee point, the cell loss probability of the low priority class is calculated from the expression (34). If the cell loss probability of the low priority class is equal to or larger than the allowable cell loss probability, it is judged that the connection request is impossible (Step 176), the release cell 12 is transmitted (Step 177), and the process returns to the call set-up request wait state (Step 178). If the cell loss probability of the low priority class at this threshold value is smaller than the allowable cell loss probability, a VCI still not assigned is extracted and reserved (Step 179).

After VCI is reserved, a call set-up cell 10 is generated. This call set-up request cell 10 is input to the switch circuit 110 and sent to an upstream ATM switch 100 via a control channel (Step 180). After completion of the above processes, the process enters an acknowledge cell wait state to wait for a response cell 11 from the upstream ATM switch 100 (Step 181). (b) Process upon reception of the response cell 11 (FIG. 2B) (FIG. 7)

Figure 7:
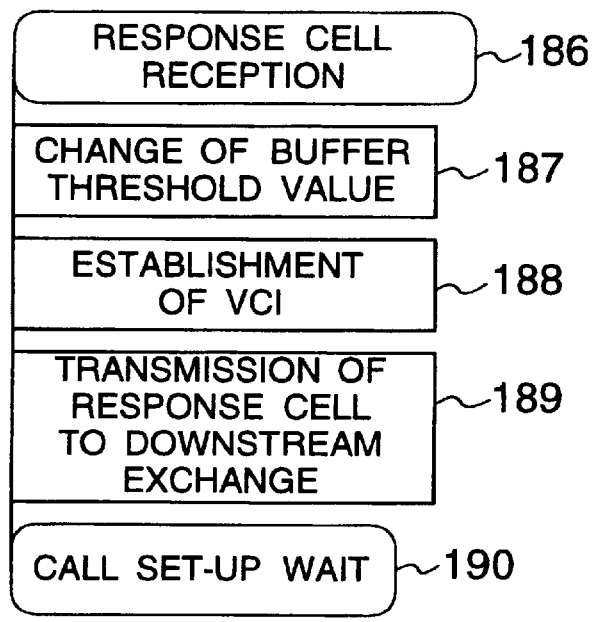
FIG. 7 is a PAD illustrating the CAC process to be executed, when a response cell is received, by the CP circuit of the ATM switch to which the invention is applied.

In the process shown in FIG. 7, when the CP circuit 140 receives the response cell 11 from the upstream ATM switch 100 (Step 186), it changes the buffer threshold value to the new threshold value calculated by the adaptive control circuit 150 (Step 187). After the buffer threshold value is changed, the reserved VCI is established (Step 188). The response cell 11 is returned to the downstream ATM switch or ATM terminal 5 (Step 189) and the process returns to the call set-up request state (Step 190).

Figure 8:
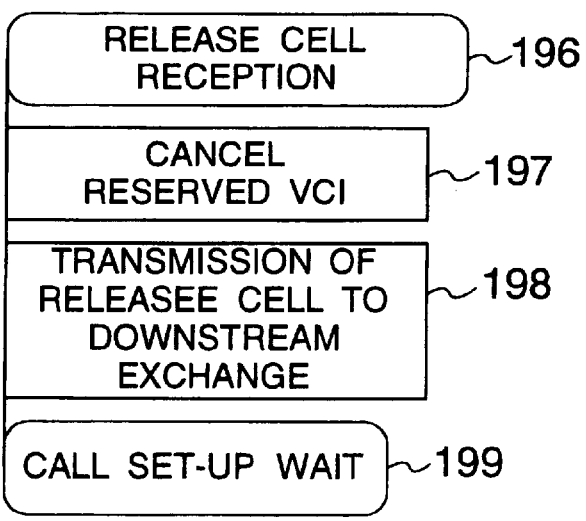
FIG. 8 is a PAD illustrating the CAC process to be executed, when a release cell is received, by the CP circuit of the ATM switch to which the invention is applied.

(c) Process Upon Reception of the Release Cell 12 (FIG. 2C) (FIG. 8)

FIG. 8 shows the procedure of the process upon reception of the release cell 12. When the CP circuit 140 receives the release cell from the upstream ATM switch 100 (Step 196), the reserved VCI is cancelled (Step 197), the release cell 12 is transmitted to the ATM switch 100 or ATM terminal 5 (Step 198), and the process returns to the call set-up request wait (Step 199).

Figure 9:
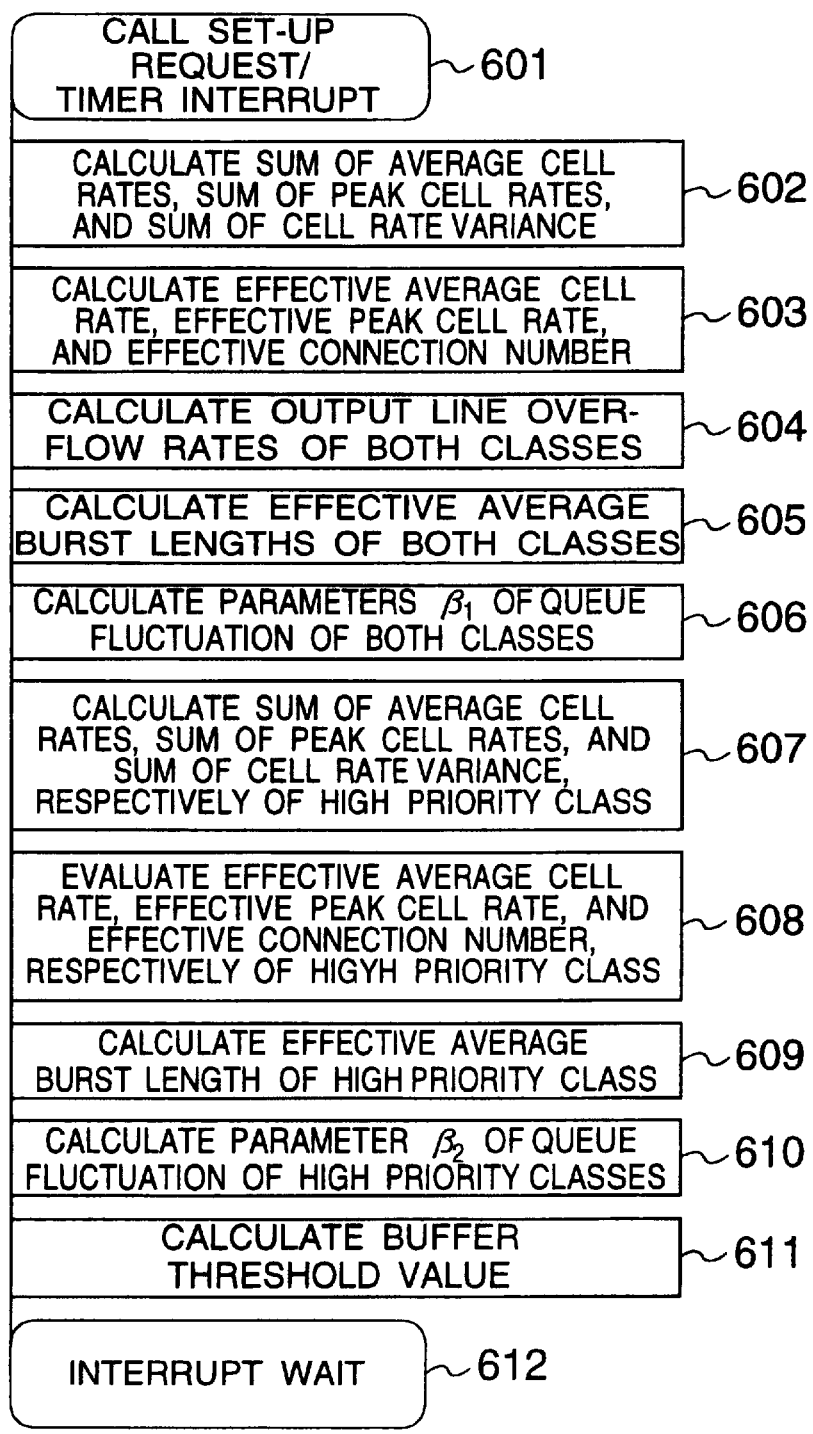
FIG. 9 is a PAD illustrating the process to be executed by the buffer threshold value adaptive control circuit of the ATM switch executing the CAC process to which the invention is applied.

(3) Operation of Buffer Threshold Value Adaptive Control Process (FIG. 9)

FIG. 9 shows the procedure of the buffer threshold value adaptive control process. Effective parameters are calculated. First, from the peak cell rate memories 153 and 159, average burst length memories 154 and 160, and squared coefficient of variations of burst length memories 155 and 161 respectively shown in FIG. 5, the peak cell rates, average burst lengths, squared coefficient of variations of burst length respectively of both the classes are read to calculate the sum of the peak cell rates, the sum of average cell rates, and the sum of variance of cell rates (Step 602). Thereafter, by using the equations (13) to (15), the effective peak cell rate, effective average cell rate, and effective connection number are calculated (Step 603). After the effective parameters are calculated, the output line overflow rate of collision of burst of both the classes is calculated by using the expression (10) (Step 604).

Next, the effective average burst length is calculated from the equation (17) by using the peak cell rate, average cell rate, average burst length, and squared coefficient of variations of burst length (Step 605). After the effective burst length is calculated, parameters describing fluctuation of queue length of burst levels of both the classes are calculated from the equation (12) (Step 606). A series of these processes corresponds to estimation of the distribution function $f(x)$ of cell loss probabilities of both the classes stored in the buffers 130.

Next, the effective average burst length of the high priority class is calculated. From the peak cell rate memory 159, average burst length memory 160, and squared coefficient of variations of burst length memory 161 respectively of the high priority class, the peak cell rate, average burst length, squared coefficient of variations of burst length respectively of the high priority class are read to calculate the sum of peak cell rates, the sum of average cell rate, and the sum of variance of cell rates respectively of the high priority class (Step 607). Thereafter, by using the equations (26) to (28), the effective peak cell rate, effective average cell rate, and effective connection number respectively of the high priority class are calculated (Step 608). Next, the effective average burst length of the high priority class is calculated by using the equation (30) (Step 609). After the effective average burst length of the high priority class is calculated, a parameter describing fluctuation of queue length of burst levels of the high priority class is calculated from the equation (25) (Step 610). These processes corresponds to estimation of the upper bound distribution function $g_s(x)$ of cell loss probabilities of the high priority class stored in the buffers 130, in accordance with the traffic characteristics of the high priority class. The buffer threshold value is calculated from the equation (33) by using the output line overflow rates of collision of bursts of both the classes, the parameters describing fluctuation of queue lengths of burst levels of both the classes, the parameter describing fluctuation of queue lengths of burst levels of the high priority class, the buffer 130 length, and the allowable cell loss probability $P_h$ of the high priority class (Step 611). These processes corresponds to obtaining an equilibrium point which makes the switch resources have an optimum assignment.

After these series of processes, the buffer threshold value is returned to the CP circuit 140 and the process returns to an interrupt wait state (Step 612).

As described so far, in this embodiment, even if the traffic characteristics of cells change dynamically while the ATM switch 100 performs statistical multiplex, the switch resources (output line capacity and buffers 130) can be distributed in an optimum way through threshold value adaptive control.

Also in this embodiment, it is possible to suppress the cell loss probability of not only the high priority class but also the low priority class equal to or lower than the allowable cell loss probability, without reversing the order of cells. In this embodiment, therefore, quality control of services of image traffics with hierarchical coding becomes possible.

Second Embodiment

In the second embodiment, an ATM switch 200 has a function of monitoring the queue length of cells at the buffer for each output line. The different point of the second embodiment from the first embodiment is that a circuit 220 (220-1, 220-2, ..., 220-n) for monitoring the queue length of cells at the buffer is added in order to deal with best effort services not declaring the traffic descriptor of the low priority class or cell traffics with a tag being affixed by the UPC circuit 122 (122-1, 122-2, ..., 122-n). In the first embodiment, a traffic descriptor at each connection is used for estimating the distribution function of cell loss probabilities for cells of both the classes stored in the buffer or for estimating the distribution function of cell loss probabilities for cells of only the high priority class stored in the buffer. In contrast, in this embodiment, although the traffic descriptor of each connection is used for estimating the distribution function of cell loss probabilities for cells of only the high priority class stored in the buffer, the distribution function of cell loss probabilities for cells of both the classes stored in the buffer is estimated from the monitored queue lengths to realize the ATM switch 200 capable of suppressing the cell loss probability of the high priority class equal to or lower than the allowable cell loss probability.

Principle

First, the approximation theory for estimating from the monitored queue lengths the distribution function of cell loss probabilities for cells of both the classes stored in the buffer will first be described.

The distribution function $f(x)$ of cell loss probabilities for cells of both the classes stored in the buffer is determined from the "parameter $\beta$ of burst level" and "output line overflow rate a by collision of bursts" by using the expression (18). In this embodiment, the queue length of cells in the buffer is monitored to obtain the "parameter $\beta$ of burst level" and "output line overflow rate a by collision of bursts" and to estimate the distribution function of cell loss probabilities for cells of both the classes stored in the buffer.

Figure 10:
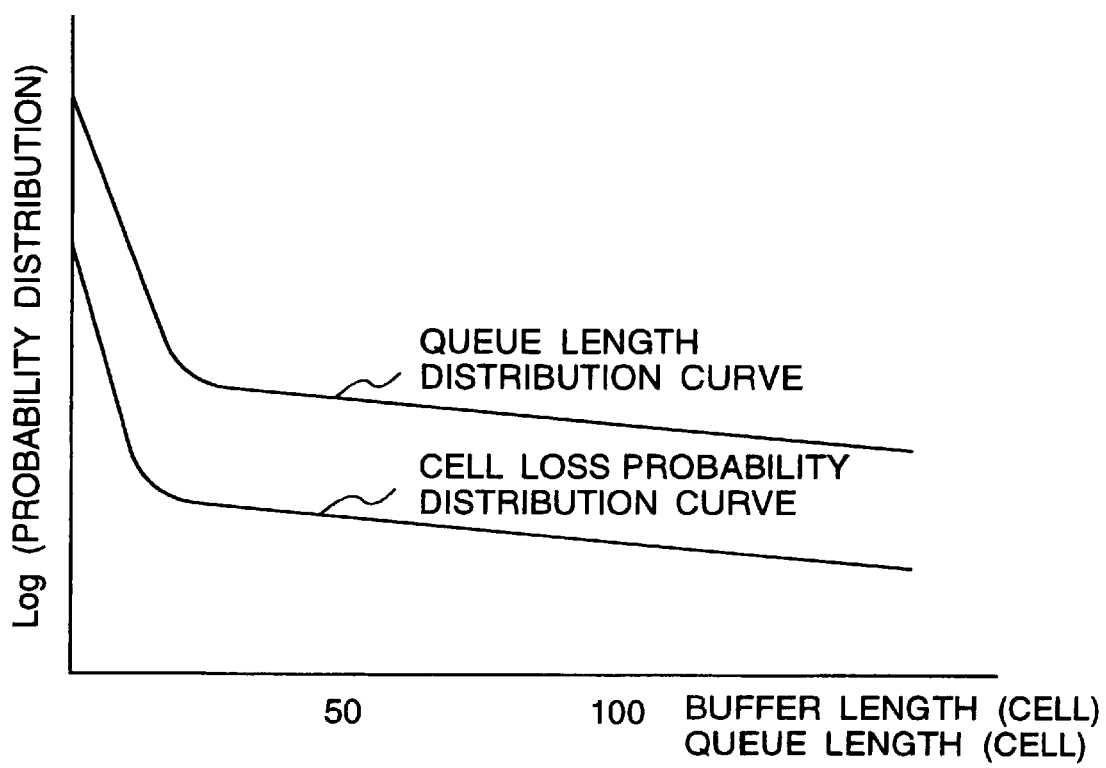
FIG. 10 shows a graph showing the relationship between cell loss probability distribution characteristics and queue length distribution characteristics.

The cell loss distribution given by the expression (8) is represented by a monotonously reducing function with an inflection point such as shown in FIG. 10, wherein the ordinate represents a logarithm of a cell loss probability and the abscissa represents a buffer length. In the area where the buffer length is longer than a certain length and the large deviation principle is effective, the cell loss probability curve is approximated to an asymptote.

The probability distribution of queue lengths can be approximated by the following expression (37).

$$d(x) \approx \rho\{1 - p_S/(1-\rho)\}\{\exp(-\beta_0 x)\} + \rho(p_S/(1-\rho))\{1-\alpha_2)\exp(-3\beta x) + \alpha_2 \exp(-\beta x)\} \quad (37)$$

where ρ represents an output line use factor, x represents a queue length (i.e., a residual amount of cells in a buffer) and $P_s$ is represented by the following equation (38).

$$p_S = \frac{a^s/(s!)}{\sum_{i=0}^{S} a^i/(i!) + (a^S/(s!))\{\rho/(1-\rho)\}} \quad (38)$$

where s represents the number of bursts which can be supported by the output line at the same time, and is given by the following equation (39).

$$s = V/v \quad (39)$$

The symbol a is a call quantity and is given by the following equation (40).

$$a = N<v>/v \quad (40)$$

The symbol $\alpha_2$ is a coupling coefficient and is given by the following equation (41).

$$\alpha_2 = \exp(-\beta(s-1)/V) \quad (41)$$

The other symbols have the same meanings as the equation (8) of the first embodiment.

Similar to the cell distribution, the queue length distribution is also represented by a monotonously reducing function with an inflection point such as shown in FIG. 10, wherein the ordinate represents a logarithm of a probability of the queue length distribution and the abscissa represents a queue length. Similar to the cell loss probability curve, in the area where the buffer length is longer than a certain length and the large deviation principle is effective, the queue length distribution curve is approximated to an asymptote.

The asymptote of the cell loss probability curve and that of the queue length distribution curve are parallel. By utilizing this nature, from the monitored queue length, the "parameter β of burst level" and "output line overflow rate a by collision of bursts" are obtained which are required for estimating the distribution function of cell loss probabilities for cells of both the classes stored in the buffer.

The "parameter β of burst level" is coincident with the parameter β of distribution function of queue lengths to be caused by collision of burst levels. Therefore, a method of obtaining the parameter β of distribution function of queue lengths of burst levels by using the monitored queue lengths will be first described. A probability of a queue length in excess of the knee point can be approximated by the following expression (42).

$$P_{b=(\rho P_S/(1-\rho))\alpha_2 \exp(-\beta x)} \quad (42)$$

An average queue length $Q_M$ of queue lengths in excess of the knee point is therefore given by the following equation (43).

$$Q_M = 1/\beta \quad (43)$$

The burst level parameter is therefore an inverse of the average queue length of queue lengths in excess of the knee point. In this invention, therefore, the burst level parameter is obtained by averaging the monitored queue lengths in excess of the knee point.

Next, a method of obtaining the "output line overflow rate α by collision of bursts" will be described. The "output line overflow rate α by collision of bursts" is a function of the output line capacity V, effective average rate <v>, effective peak rate v, and effective connection number N. Similarly, the probability $\rho(P_s/(1-\rho))$ of queue length in the whole burst is also a function of the output line capacity V, effective average rate <v>, effective peak rate v, and effective connection number N. The "output line overflow rate α by collision of bursts" is one-to-one correspondence with the probability of occurrence of queue length in the whole burst. It is therefore possible to obtain the "output line overflow rate α by collision of bursts" from the probability $\rho(P_s/(1-\rho))$ of queue length in the whole burst. In this invention, therefore, the distribution function of cell loss probabilities of cells of both the classes can be obtained from the frequency of monitored queue lengths in excess of the knee point.

From the above reason, the distribution function of cell loss probabilities of cells of both the classes can be estimated from the monitored queue lengths of cells stored in the buffer, by using the occurrence frequency and average value of queue lengths in excess of the knee point.

Structure (1) Overall Structure

FIG. 11 shows an example of the structure of the ATM switch 200. The different point of the ATM switch 200 of this embodiment from a conventional ATM switch is that a queue length monitoring circuit 220 and a buffer threshold value adaptive control circuit 250 are provided in order to suppress the cell loss probability of the high priority class equal to or lower than an allowable cell loss probability even if the cell traffic characteristics of a low priority class is degraded, by estimating from the cell traffic characteristics a distribution of cell loss probabilities at the buffer 130 and performing adaptive control of buffer threshold values.

Figure 13:
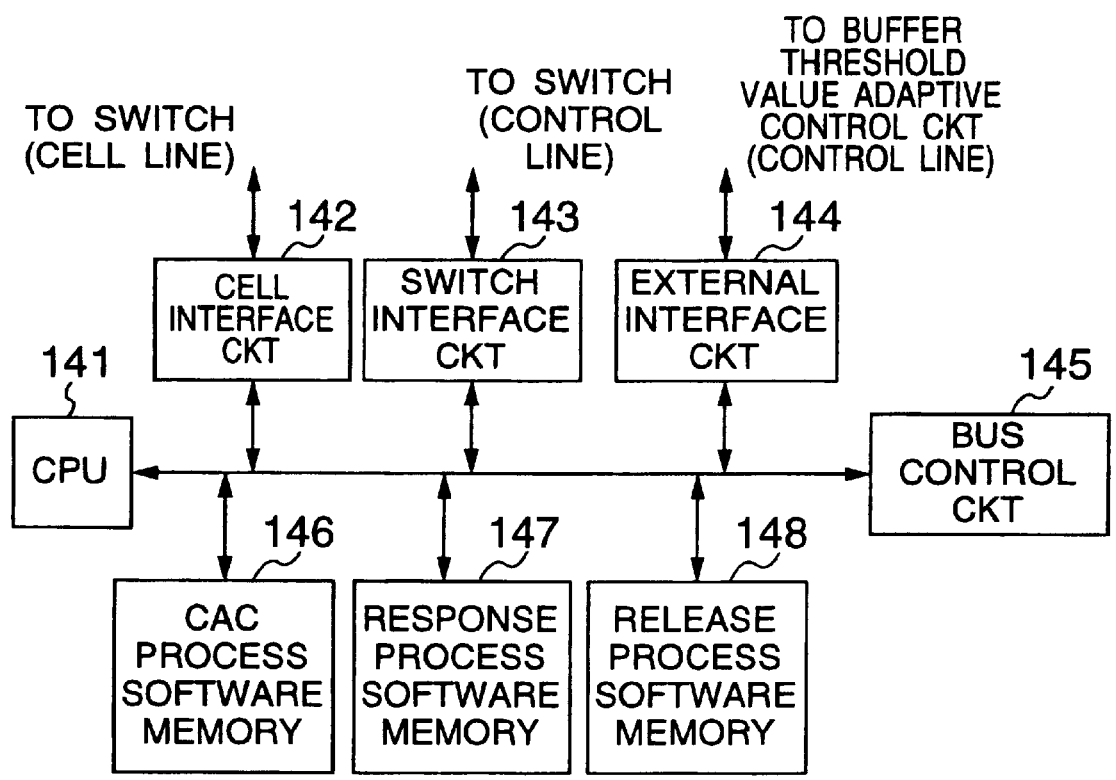
FIG. 13 is a block diagram showing the structure of the CP circuit of the ATM switch in which queue lengths in buffers are monitored, according to the present invention.

Of these constituent elements, a CP circuit 240 is in charge of software processing such as CAC. As shown in FIG. 13, the CP circuit 240 is constituted by a CPU 141, a CAC process software memory 146, a response process software memory 147, a release process software memory 148, a cell interface circuit 142, a switch interface circuit 143, and an external interface circuit 144, which are all connected to a bus under control of a bus control circuit 145. The contents of the CAC process software memory 146 and response process software memory 147 are slightly different from the first embodiment.

The other constituent elements are the same as the first embodiment, and the detailed description thereof is omitted.

(2) Structure of the Queue Length Monitoring Circuit 220

Figure 12:
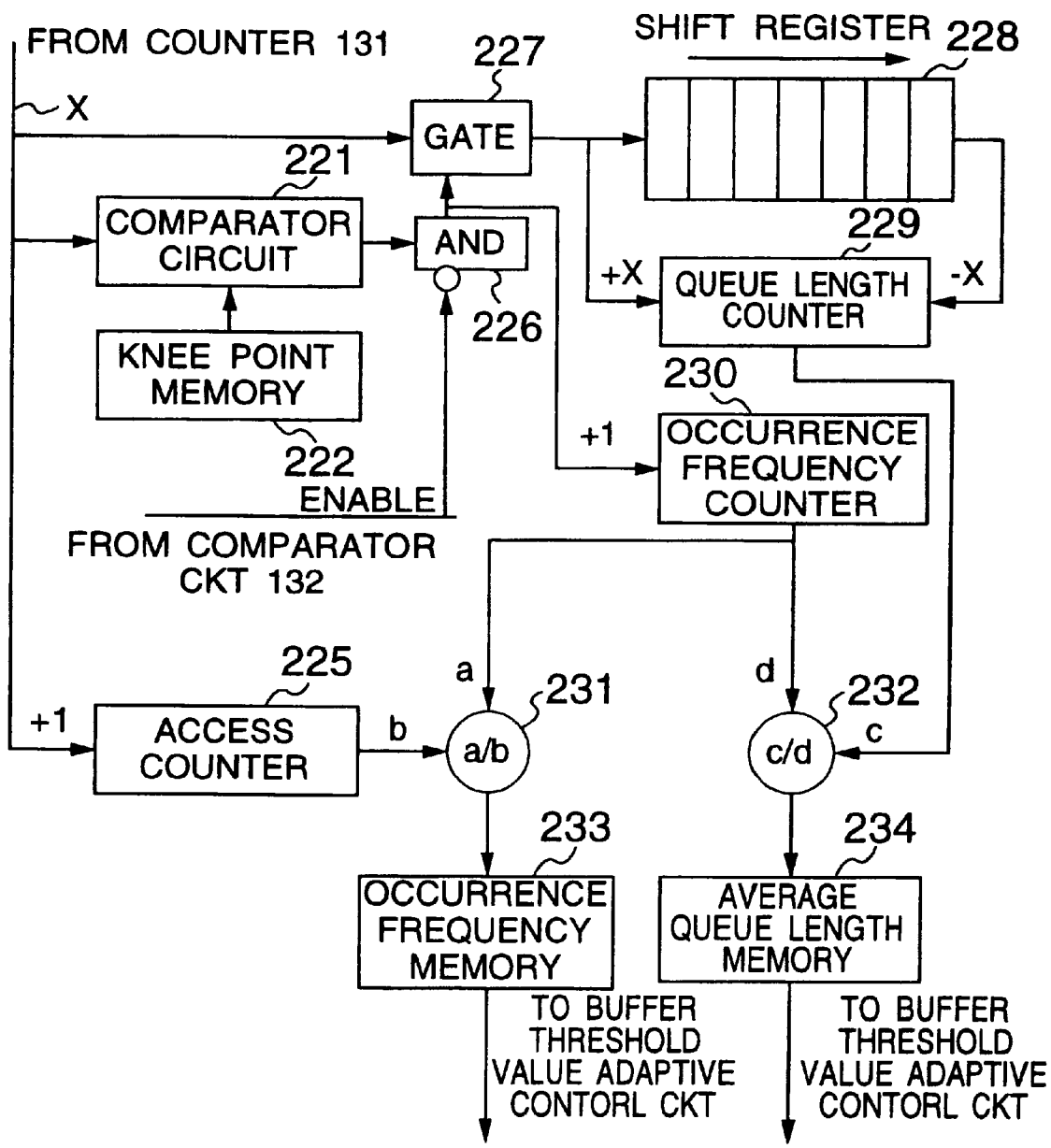
FIG. 12 is a block diagram showing the structure of a queue length monitoring circuit.

The queue length monitoring circuit 220 is constituted, as shown in FIG. 12, by a comparator circuit 221, a knee point memory 222, an access counter 225, a shift register 228, an occurrence frequency counter 230, division circuits 231 (a/b) and 232 (c/d), an occurrence frequency memory 233, and an average queue length memory 234. The knee point memory 222 stores an upper bound value of the knee point defined by the equation (36). The occurrence frequency memory 233 stores an occurrence frequency parameter representative of an occurrence frequency of the queue length in excess of the knee point and equal to or lower than the buffer threshold value. The average queue length memory 234 stores an average queue length of queue lengths in excess of the knee point and equal to or lower than the buffer threshold value.

Figure 14:
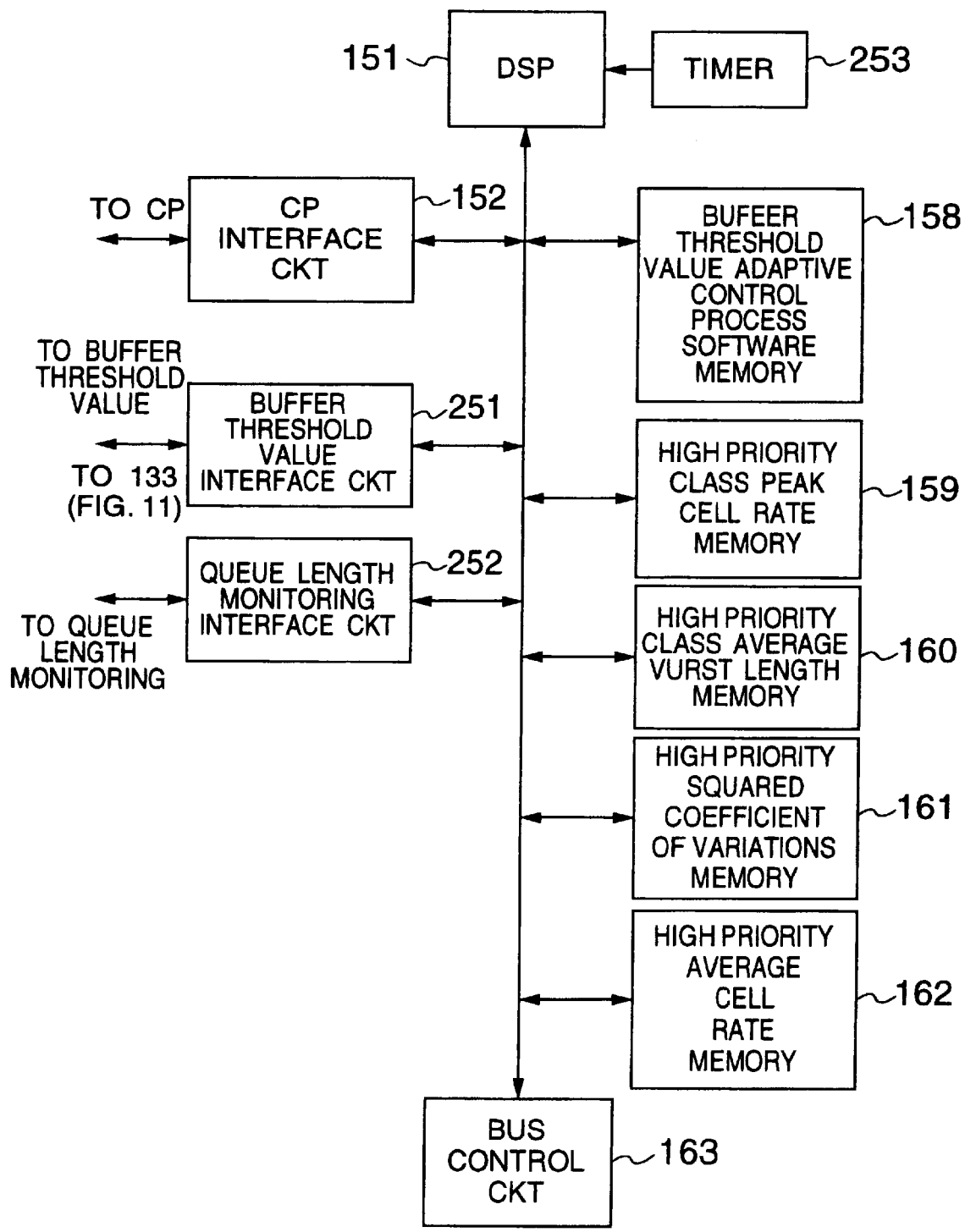
FIG. 14 is a block diagram showing the structure of the buffer threshold value adaptive control circuit of the ATM switch in which queue lengths in buffers are monitored, according to the present invention.

(3) Structure of the Buffer Threshold Value Adaptive Control Circuit 250 (FIG. 14)

The buffer threshold value adaptive control circuit 250 is constituted by a DSP 151, a buffer threshold value interface circuit 251, a CP interface circuit 152, a queue length monitoring interface circuit 252, a buffer threshold value adaptive control software memory 158, a peak cell rate memory 159 for the high priority class, an average burst length memory 160 for the high priority class, a squared coefficient of variations memory 161 for the high priority class, and an average cell rate 162 for the high priority class, which are all connected by a bus under control of a bus control circuit 163.

The different point of the buffer threshold value adaptive control circuit 250 of this embodiment from the buffer threshold value adaptive control circuit 150 of the first embodiment is that in this embodiment since the cell loss probability for the low priority class is estimated from the monitored queue length of cells in the buffer, the queue length monitoring interface circuit 252, the buffer threshold value interface circuit for updating the buffer threshold value memory, and a timer 253 for periodically activating DSP 151 are provided in place of the memory for storing the traffic descriptor for the low priority class.

Operation (1) Outline of Operation

At the set-up of the ATM switch 200 shown in FIG. 11, the upper bound value of the knee point defined by the equation (36) is stored in the knee point memory 222 of the queue length monitoring circuit 220. As the user cell 15 flows into the ATM switch 200 shown in FIG. 11, the switch circuit 110 performs switching of cells to distribute them among the buffers 130 for respective output lines. At the same time, it turns on the high priority signal if the user cell 15 is of the high priority class. As the user cell enters the buffer 130, the queue length counter 131 counts up by "+1". As the user cell is output from the buffer 130, the queue length counter 131 counts down by "−1". The comparator circuit 132 compares the count of the queue length counter 131 with a buffer threshold value in the buffer threshold value memory 133. If the count exceeds the threshold value and the high priority signal is off, an enable signal is turned off to instruct the switch circuit 110 to discard the user cell 15 of the low priority class.

The queue length monitoring circuit 220 is periodically input with the value of the queue length counter 131. As the value of the queue length counter 131 is input, the queue length monitoring circuit 220 calculates the occurrence frequency and average value of queue lengths in excess of the knee point and equal to or lower than the buffer threshold value.

In accordance with the occurrence frequency and average value of queue lengths in excess of the knee point and equal to or lower than the buffer threshold value calculated by the queue length monitoring circuit 220 and the traffic descriptor of a connection of the high priority class, the buffer threshold value adaptive control circuit 250 periodically calculates the buffer threshold value which optimizes assignment of switch resources, by using the equation (7), and updates the previous buffer threshold value.

(2) CAC Process 270

In the CAC process of this embodiment, the connection of the high priority class only is the same as the case where cell loss priority control is not executed. Upon reception of the call set-up request cell 10 (FIG. 2A), response cell 11 (FIG. 2B), a release cell 12 (FIG. 2C) from the ATM terminal 5 or another ATM switch 100, the switch circuit 110 transfers these cells to the CP circuit 240 shown in FIG. 11. These control cells transferred to the CP circuit 240 interrupt CPU 141. The interrupted CPU 141 executes a specific process for each type of these control cells.

Figure 15:
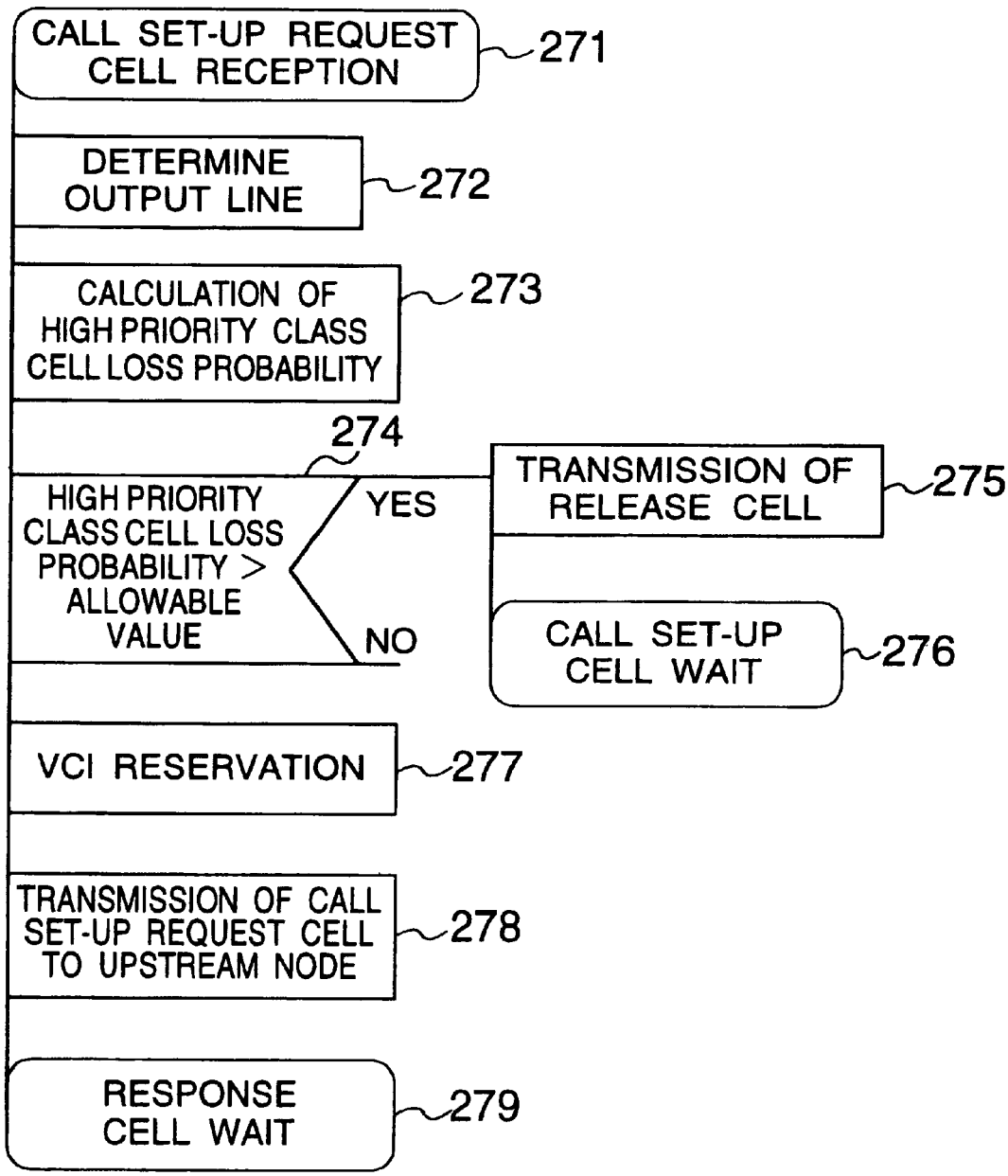
FIG. 15 is a PAD illustrating the CAC process to be executed, when a call set-up request cell is received, by the CP circuit of the ATM switch in which queue lengths in buffers are monitored, according to the present invention.

(a) CAC Process (FIG. 15)

When the call set-up request cell 10 (FIG. 2A) is received (Step 271), an output line corresponding to a destination VCI (Virtual Channel Identifier) is determined (Step 272). After the output line is determined, the CP circuit 240 shown in FIG. 11 reads the value of the traffic descriptor of the call set-up request cell 10 and reads the peak cell rate, average burst length, squared coefficient of variations of burst length, and average cell rate respectively of the high priority class from the peak cell rate memory 159, average burst length memory 160, squared coefficient of variations of burst length memory 161, and average cell rate memory 162 of the buffer threshold value adaptive control circuit 250 shown in FIG. 14 respectively of the high priority class, to thereby calculate the cell loss probability with the high priority class only being connected, by using the expression (21) (Step 273).

If the cell loss probability with the high priority class only being connected is higher than the allowable cell loss probability, it is judged that a reception is impossible (Step 274), the release cell 12 is transmitted (Step 275), and the process returns to a call set-up request wait state (Step 276).

If the cell loss probability with the high priority class only being connected is equal to or lower than the allowable cell loss probability, a VCI still not assigned is extracted and reserved (Step 277).

After VCI is reserved, a call set-up cell 10 is generated. This call set-up request cell 10 is input to the switch circuit 110 and sent to an upstream ATM switch 100 via a control channel (Step 278). After completion of the above processes, the process enters an acknowledge cell wait state to wait for a response cell 11 from the upstream ATM switch 100.

Figure 16:
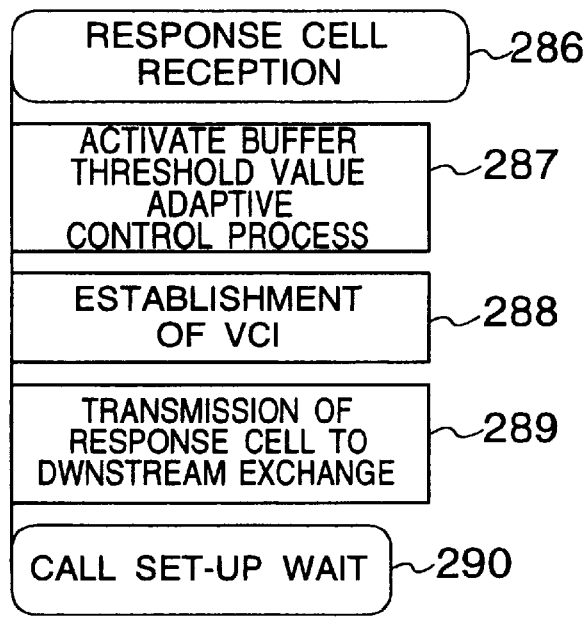
FIG. 16 is a PAD illustrating the CAC process to be executed, when a response cell is received, by the CP circuit of the ATM switch in which queue lengths in buffers are monitored, according to the present invention.
Figure 17:
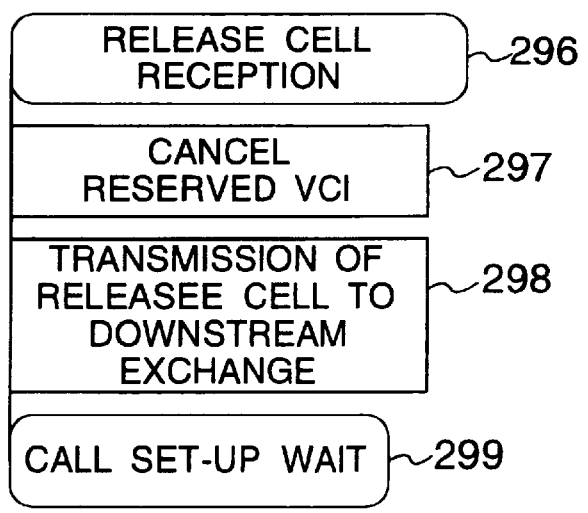
FIG. 17 is a PAD illustrating the CAC process to be executed, when a release cell is received, by the CP circuit of the ATM switch in which queue lengths in buffers are monitored, according to the present invention.

(b) Process Upon Reception of the Response Cell 11 (FIG. 2B) (FIG. 16)

When the CP circuit 240 receives the response cell 11 from the upstream ATM switch 100 (Step 286), it writes the value of the traffic descriptor of the connection to which the call set-up request was issued, into the peak cell rate memory 159, average burst length memory 160, squared coefficient of variations of burst length memory 161, and average cell rate memory 162 shown in FIG. 14 respectively of the high priority class, and activates the buffer threshold value adaptive control circuit 250 (Step 287). After the adaptive control circuit 250 is activated, the reserved VCI is established (Step 288). After the establishment of the reserved VCI, the response cell 11 is returned to the downstream ATM switch 100 or ATM terminal 5 (Step 289) and the process returns to the call set-up request state (Step 290).

(c) Process Upon Reception of the Release Cell 12 (FIG. 2C)

This process is the same as the first embodiment, and so the detailed description is omitted (refer to FIG. 8).

(3) Operation of the Queue Length Monitoring Circuit 220 (FIG. 12)

The queue length monitoring circuit 220 shown in FIGS. 11 and 12 is input with the enable signal and the value of the queue length counter 131.

As the value of the queue length counter 131 is input, the comparator circuit 221 compares the value of the queue length counter 131 with the value in the knee point memory 222. If the value of the queue length counter 131 is larger than the value in the knee point memory 222, a pulse signal is output. As the value of the queue length counter 131 is input, the access counter 225 counts up by "+1". After the count-up, the access counter 225 outputs the present count value to the division circuit (a/b) 231.

If the pulse signal from the comparator circuit 221 is on and the enable signal is off, a gate 227 is opened and the value of the counter 131 is added to the queue length counter 229. At the same time, the value of the counter 131 is registered in the shift register 228. Thereafter, the oldest value in the shift register 228 is subtracted by the queue length counter 229. After this subtraction, the queue length counter 229 outputs the present count value to the division circuit (c/d) 232. If the pulse signal of the comparator circuit 221 is on and the enable signal is off, the occurrence frequency counter 230 counts up by "+1". After the count-up, the occurrence frequency counter 230 outputs the present count value of the division circuits 231 and 232.

As the count values of the occurrence frequency counter 230 and access counter 225 are input to the division circuit 231, the division circuit 231 stores a quotient of the count value of the occurrence frequency counter 230 divided by the count value of the access counter 225 into the occurrence frequency memory 233. This value stored in the occurrence frequency memory 233 is the occurrence frequency parameter representative of an occurrence frequency of queue lengths in excess of the knee value and equal to or lower than the buffer threshold value.

As the count values of the queue length counter 229 and occurrence frequency counter 230 are input to the division circuit 232, the division circuit 232 stores a quotient of the count value of the queue length counter 229 divided by the count value of the occurrence frequency counter 230 into the average queue length memory 234. This value stored in the average queue length memory 234 is the average queue length in excess of the knee value and equal to or lower than the buffer threshold value.

Figure 18:
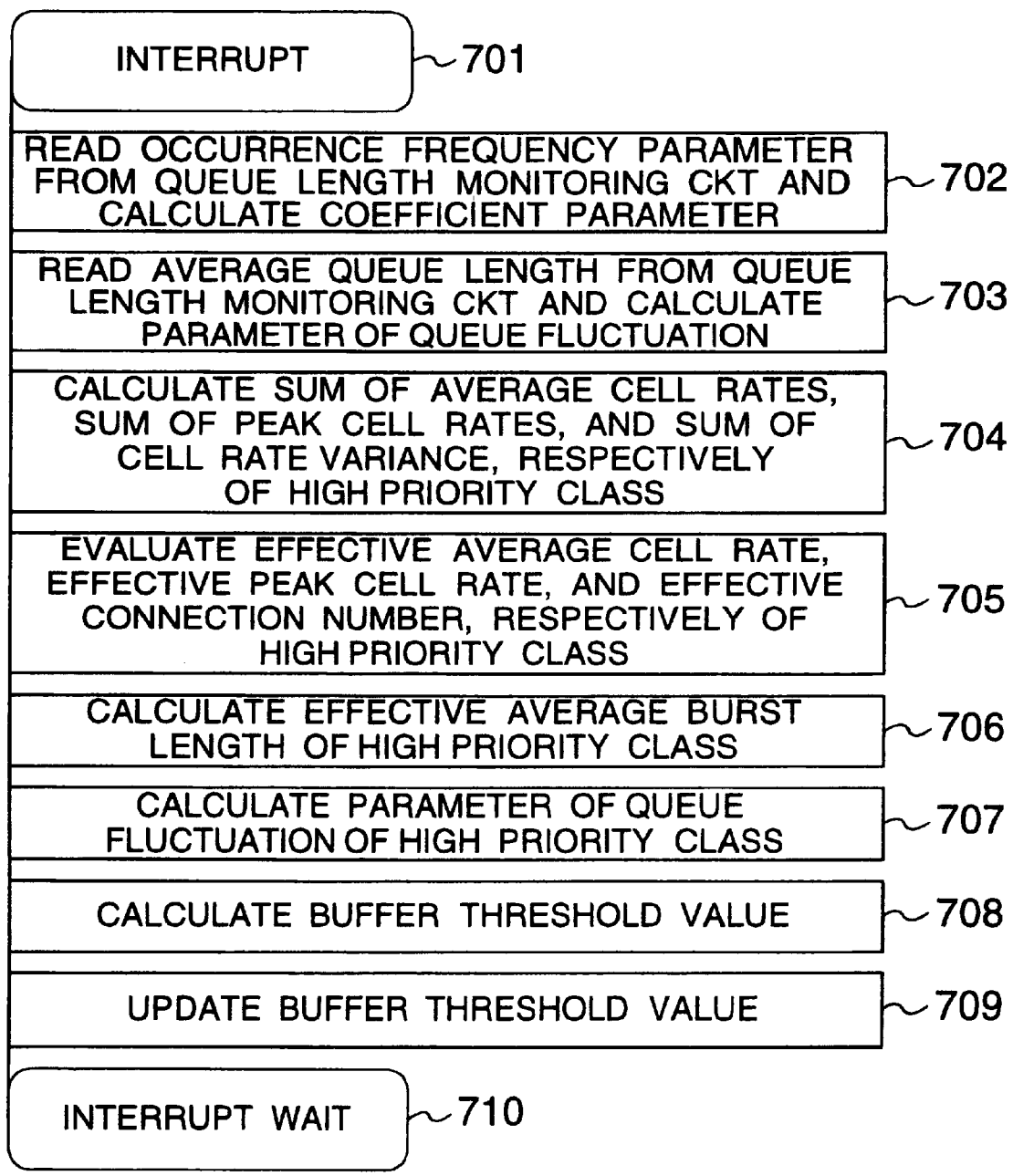
FIG. 18 is a PAD illustrating the process to be executed by the buffer threshold value adaptive control circuit of the ATM switch in which queue lengths in buffers are monitored, according to the present invention.

(4) Operation of the Buffer Threshold Value Adaptive Control Circuit (FIG. 18)

In the buffer threshold value adaptive control circuit (FIG. 14), DSP 151 is periodically activated by the timer 253. As DSP is activated, the occurrence frequency parameter representative of an occurrence frequency of queue lengths in excess of the knee value and equal to or lower than the buffer threshold value is read via the queue length monitoring interface circuit 252 from the occurrence frequency memory 233 of the queue length monitoring circuit 220 (FIG. 12) (FIG. 18: Step 702). Next, the average queue length in excess of the knee value and equal to or lower than the buffer threshold value is read via the queue length monitoring interface circuit 252 from the average queue length memory 234 of the queue length monitoring circuit 220, and an inverse of the average queue length is used as the parameter of queue fluctuation of burst levels of both the classes (Step 703). A series of these processes corresponds to estimating the distribution function f(x) of cell loss probabilities of cells of both the classes stored in the buffer 130.

Next, the effective average burst length of the high priority class is calculated. From the peak cell rate memory 158, average burst length memory 160, and squared coefficient of variations of burst length memory 161 respectively shown in FIG. 14, the peak cell rate, average burst length, and squared coefficient of variations of burst length respectively of the high priority class are read to calculate the sum of peak cell rates, the sum of average cell rate, the sum of variance of cell rates respectively of the high priority class (Step 704). Thereafter, by using the equations (26) to (28), the effective peak cell rate, effective average cell rate, and effective connection number respectively of the high priority class are calculated (Step 705). Next, the effective average burst length of the high priority class is calculated by using the equation (30) (Step 706). After the effective average burst length of the high priority class is calculated, a parameter describing fluctuation of queue length of burst levels of the high priority class is calculated from the equation (25) (Step 707). A series of these processes corresponds to estimation of the upper bound distribution function $g_s(x)$ of cell loss probabilities of the high priority class stored in the buffers 130, in accordance with the traffic characteristics of the high priority class.

The buffer threshold value is calculated from the equation (33) by using the output line overflow rates of collision of bursts of both the classes, the parameters describing fluctuation of queue lengths of burst levels of both the classes, the parameter describing fluctuation of queue lengths of burst levels of the high priority class, the buffer 130 length, and the allowable cell loss probability $P_h$ of the high priority class (Step 708). A series of these processes corresponds to obtaining an equilibrium point which makes the switch resources have an optimum assignment.

If the estimated buffer threshold value is different from the present buffer threshold value, the buffer threshold value in the buffer threshold value memory 132 is updated via the buffer threshold value interface circuit 251 (Step 709). After these series of processes, the process returns to an interrupt wait state (Step 710).

As described so far, in this embodiment, even if the traffic characteristics of cells change dynamically while the ATM switch 200 performs statistical multiplex, the switch resources (output line capacity and buffers) can be distributed in an optimum way through threshold value adaptive control.

According to the embodiment, in the case wherein communication services guaranteeing a cell loss probability are assigned the high priority class and best effort services are assigned the low priority class, it is possible to suppress the guaranteed cell loss probability equal to or lower than the allowable cell loss probability, because the guaranteed cell loss probability of communication services with the high priority class being assigned does not adversely affect the cell of best effort services.

Further, according to the embodiment, in the case wherein communication services guaranteeing a cell loss probability are assigned the high priority class and cells affixed with a violation tag by the UPC circuit are assigned the low priority class, it is possible to suppress the guaranteed cell loss probability equal to or lower than the allowable cell loss probability, because the guaranteed cell loss probability of communication services with the high priority class being assigned does not adversely affect the cell affixed with the violation tag.

In this case, according to the embodiment, a false alarm rate (probability of erroneously judging a cell not violating the declared value as a violating cell) can be distributed into the cell loss probability of the low priority class and the cell loss probability of the UPC circuit. For example, if it is necessary to suppress the false alarm rate to $1/10^{10}$ or lower and the cell loss probability of the low priority class without no declared value violation is suppressed to $1/10^5$ or lower, the false alarm rate of the UPC circuit can be relaxed from $1/10^{10}$ to $1/10^5$. It is therefore possible to shorten greatly the dwell time (an integral time required for judging whether cells are not violating the declared values) of the UPC circuit 122 or to lower the threshold level.

Third Embodiment

FIG. 19 shows the structure of an ATM switch 300 with a traffic monitoring function for each connection, according to the third embodiment of the invention. The different point of the third embodiment from the first embodiment is that a cell monitoring circuit 400 for monitoring the traffic characteristics of input cells is added in order to deal with available services assigned the high priority class and best effort services assigned the low priority class. In the first embodiment, a traffic descriptor at each connection is used for estimating the distribution function of cell loss probabilities for cells of both the classes stored in the buffer or for estimating the distribution function of cell loss probabilities for cells of only the high priority class stored in the buffer. In contrast, in this embodiment, in order to deal with available services which execute flow control and best effort services which do not declare the traffic descriptor, the distribution function of cell loss probabilities is estimated by monitoring the average cell rate, peak cell rate, average and variance of burst lengths, and average and variance of burst intervals, although the first embodiment estimates the distribution function of cell loss probabilities by using the traffic descriptor of each connection.

Principle

The principle of estimating the cell loss probability is the same as the first embodiment, and so the detailed description thereof is omitted.

Structure (1) Overall Structure

FIG. 19 shows an example of the structure of the ATM switch 300. The different point of the ATM switch 300 of this embodiment from a conventional ATM switch is that the input line interface (IF) circuit 120 uses a cell monitoring circuit 400 (400-1, 400-2, ..., 400-n) and a buffer threshold value adaptive control circuit 350 in place of the UPC circuit 122 (122-1, 122-2, 122-n) in order to suppress the cell loss probability of the high priority class equal to or lower than an allowable cell loss probability even if the cell traffic characteristics of both the classes are dynamically degraded, by estimating from the cell traffic characteristics a distribution of cell loss probabilities at the buffer 130 and performing adaptive control of buffer threshold values.

Figure 20:
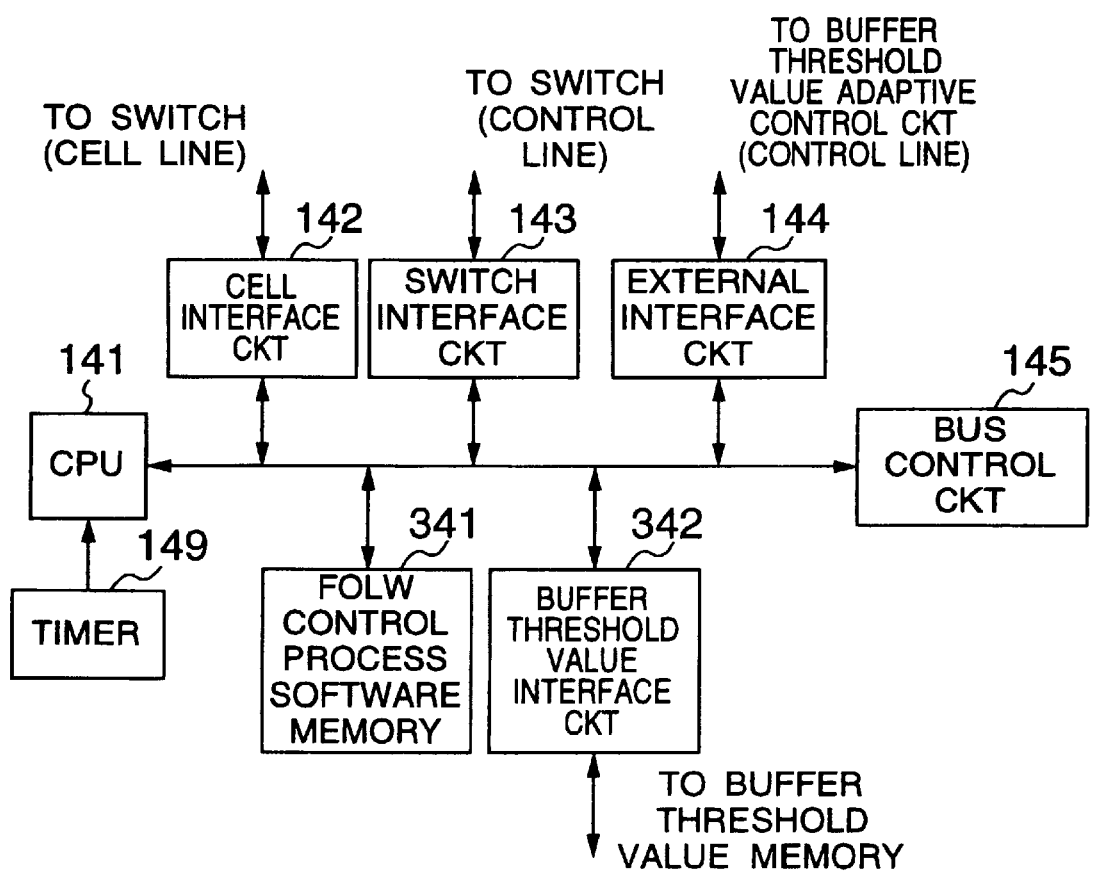
FIG. 20 is a block diagram showing the structure of the CP circuit of the ATM switch in which the traffic characteristics of input cells are monitored, according to the present invention.

Of these constituent elements, a CP circuit 340 is in charge of software processing such as flow control. As shown in FIG. 20, the CP circuit 340 is constituted by a CPU 141, a flow rate control process software memory 341, an external interface circuit 342 for updating the buffer threshold value memory, a cell interface circuit 142, a switch interface circuit 143, an external interface circuit, and a timer 149, which are all connected to a bus under control of a bus control circuit 145.

The other constituent elements are the same as those of the first embodiment, and so the detailed description thereof is omitted.

Figure 21:
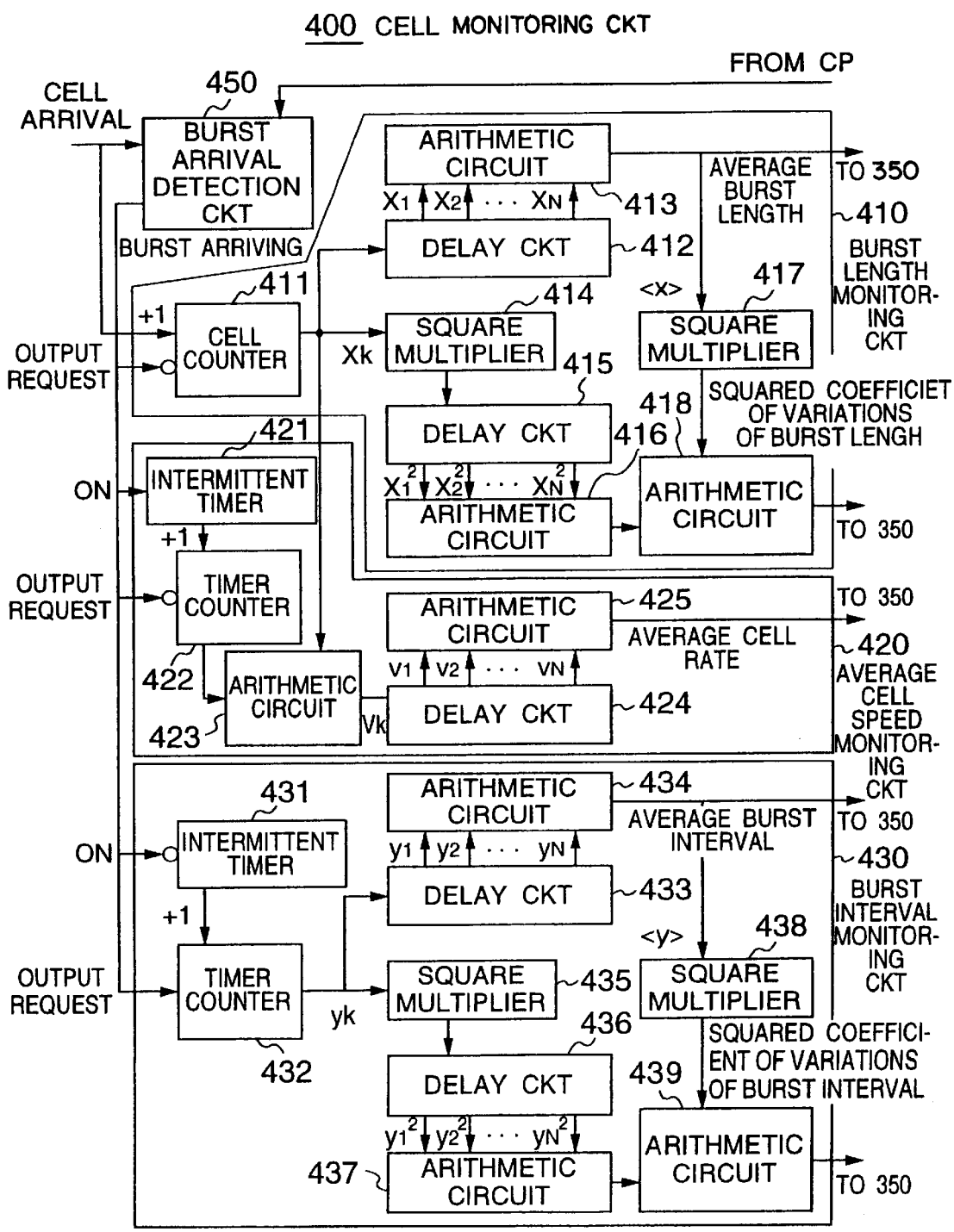
FIG. 21 is a block diagram showing the structure of a cell monitoring circuit for monitoring the traffic characteristics of input cells.

(2) Structure of the Cell Monitoring Circuit 400 (FIG. 21)

As shown in FIG. 21, in this embodiment, the cell monitoring circuit 400 is constituted by a burst arrival detection circuit 450, a burst length monitoring circuit 410, an average cell rate monitoring circuit 420, and a burst interval monitoring circuit 430.

Figure 22:
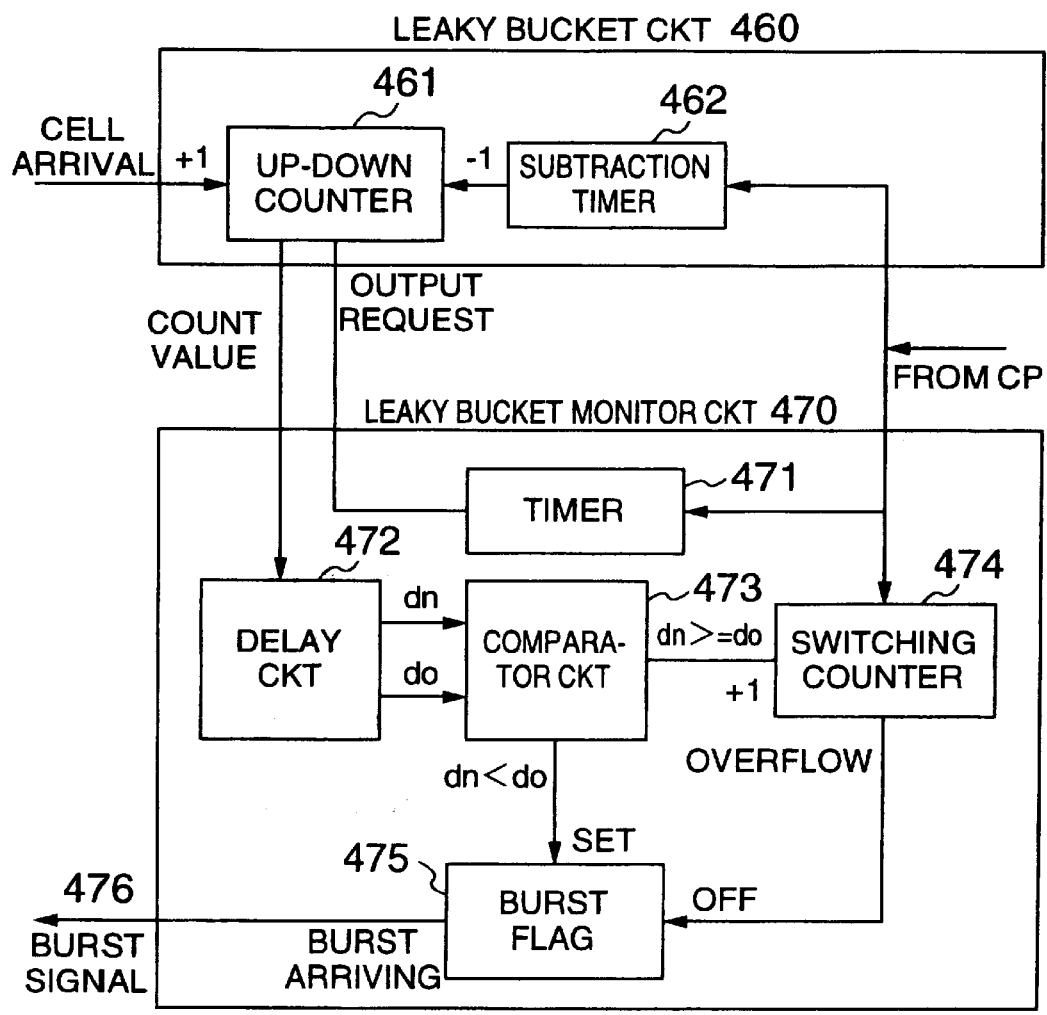
FIG. 22 is a block diagram showing the structure of a burst arrival detection circuit.

(a) Burst Arrival Detection Circuit 450 (FIG. 22)

The burst arrival detection circuit 450 has a function of detecting the start and end of a burst containing cells of different intervals, and synchronously outputting burst start and end signals each time the burst start and end occur. In this embodiment, the function of detecting the start and end of a burst containing cells of different intervals is realized by the burst arrival detection circuit 450 constituted by a combination of a leaky bucket circuit 460 and a leaky bucket monitor circuit 470 for monitoring an increase rate of the count value (bucket depth) of the leaky bucket.

The leaky bucket circuit 460 is constituted by an up-down counter 461 and a subtraction timer 462, and the leaky bucket monitor circuit 470 is constituted by a time 471, a delay circuit 472, a comparator circuit 473, a switching counter 474, and a burst flag 475.

(b) Burst Length Monitoring Circuit 410 (FIG. 21)

The burst length monitoring circuit 410 is constituted by a cell counter 411, a delay circuit 412, an arithmetic circuit ($<x>=\Sigma X_k/N$) 413, a square multiplier 417, another square multiplier 414, another delay circuit 415, another arithmetic circuit ($<x^2>=\Sigma X^2_k/N$) 416, and another arithmetic circuit ($(<x^2>/<x>^2)-1$) 418. The different point of the burst length monitoring circuit 419 from a conventional window type monitoring circuit is that the cell counter 411 counts up arrived cells only during the period form the start to the end of the burst.

(c) Average Cell Rate Monitoring Circuit 420 (FIG. 21)

The average cell rate monitoring circuit 420 is constituted by an intermittent timer 421, a timer counter 422, an arithmetic circuit ($v_x = x_k/t$) 423, a delay circuit, and an arithmetic circuit ($<x>=\Sigma v_k/N$) 425. The different point of this circuit 420 from a conventional window type monitoring circuit is that the average cell rate is monitored during the period form the start to the end of the burst.

(d) Burst Interval Monitoring Circuit 430 (FIG. 21)

The burst interval monitoring circuit 430 is constituted by an intermittent timer 431, a timer counter 432, a delay circuit 433, an arithmetic circuit ($<y>=\Sigma y_k/N$) 434, a square multiplier 438, another square multiplier 435, another delay circuit 436, another arithmetic circuit ($<y^2>=\Sigma y^2_k/N$) 437, and another arithmetic circuit ($(<y^2>/<y>^2)-1$) 439. The different point of the burst interval monitoring circuit 430 from a conventional window type monitoring circuit is that the cell counter 411 counts up arrived cells only during the period form the end of one burst to the arrival of the next burst.

Figure 23:
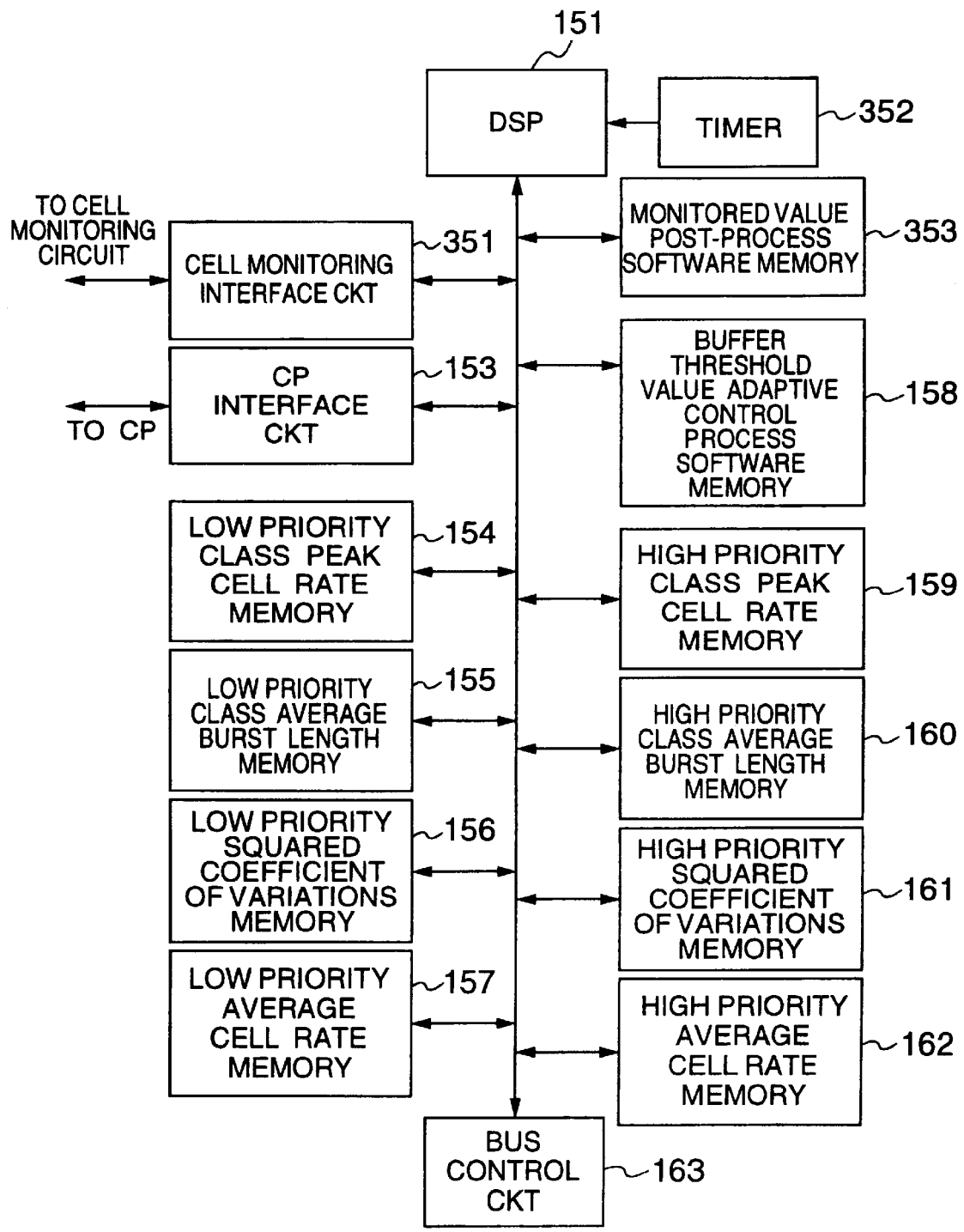
FIG. 23 is a block diagram showing the structure of the buffer threshold value adaptive control circuit of the ATM switch in which the traffic characteristics of input cells are monitored, according to the present invention.

(3) Structure of the Buffer Threshold Value Adaptive Control Circuit 350 (FIG. 23)

In this embodiment, the buffer threshold value adaptive control circuit 350 has a cell monitoring interface circuit 351 and a monitored value post-process software memory 353 for the post-process of the monitored value in addition to the constituent elements of the adaptive control circuit 150 of the first embodiment, in order to estimate the cell loss probability from the monitored value by the cell monitoring circuit 400 for monitoring the traffic characteristics of input cells. The other constituent elements are the same as those of the adaptive control circuit 350 of the first embodiment, and so the detailed description thereof is omitted.

Operation (1) Outline of Operation

As the user cell 15 flows into the ATM switch 300 shown in FIG. 19, the cell monitoring circuit 400 measures the peak cell rate, average and variance (squared coefficient of variations) of burst lengths, and average and variance (squared coefficient of variations) of burst intervals for each connection. These monitored values are input to the buffer threshold value adaptive control circuit 350. As the monitored values are input, the buffer threshold value adaptive control circuit 350 performs a post-process of the monitored values and stores the peak cell rate, average burst length, average cell rate, and squared coefficient of variations of burst lengths for each connection obtained by the post-process.

Next, the switch circuit 110 performs switching of cells to distribute them among the buffers 130 for respective output lines. At the same time, it turns on the high priority signal if the user cell 15 is of the high priority class. As the user cell enters the buffer 130, the queue length counter 131 counts up by "+1". As the user cell is output from the buffer 130, the queue length counter 131 counts down by "−1". The comparator circuit 132 compares the count of the queue length counter 131 with a buffer threshold value in the buffer threshold value memory 133. If the count exceeds the threshold value and the high priority signal is off, an enable signal is turned off to instruct the switch circuit 110 to discard the user cell 15 of the low priority class.

The CP circuit 340 (FIG. 20) periodically obtains an equilibrium point which gives optimum assignment of the switch resources, in accordance with the peak cell rate, average burst length, average cell rate, and squared coefficient of variations of burst lengths for each connection obtained by the cell monitoring circuit 400, and updates the buffer threshold value. If the buffer threshold value is lower than the bound knee point, it is judged as an overload state, and a congestion notification cell 13 (FIG. 2D) is transmitted to the ATM terminal 5 to perform flow rate control. If the buffer threshold value recovers the knee point or higher, a congestion recovery cell 14 (FIG. 2E) is transmitted and the flow rate control is terminated.

(2) Operation of the Cell Monitoring Circuit 400 (FIG. 22)

(a) Burst Arrival Detection Circuit 450 (FIG. 22)

In the leaky bucket circuit 460, the up-down counter 461 counts up each time a cell arrives. At the same time, the count-down timer 462 counts down the up-down counter 461 so as to maintain a constant count-down rate until the value of the up-down counter 461 becomes "0".

The leaky bucket monitor circuit 470 reads the present value ($d_n$) of the counter 461 from the leaky bucket circuit 460 at a constant period, and obtains a difference from the value of ($d_0$) the counter 461 read one event before. At this time, the timer 471 outputs a read request signal at the constant period. When the read request signal is output, the value of the up-down counter 461 of the leaky bucket circuit 460 is output. As the value of the counter 461 is output, the comparison circuit 473 obtains a difference between the value of the counter 461 and the value of the counter 461 read one event before stored in the delay circuit 472.

When the difference between the value of the counter 461 and the value of the counter 461 read one event before changes to a positive value, the leaky bucket monitor circuit 470 judges that a burst has arrived and turns on a burst signal 476. At this time, if the burst flag 475 is "0", the comparator circuit 473 changes the burst flag 475 from "0" to "1". If the burst flag 475 is already "1", it does not change. As the burst flag 475 is changed from "0" to "1", the burst signal 476 changes from off to on. At the same time, the switching counter 474 is cleared to "0".

If the difference between the present value of the up-down counter 461 and the value read one event before takes "0" a plurality of events serially or a negative value, the leaky bucket monitor circuit 470 judges that the burst has ended, and turns off the burst signal 476. At this time, the comparison circuit 473 counts up the switching counter 474 if the difference between the present value of the up-down counter 461 and the value read one event before is "0". If the switching counter 474 overflows, the burst flag 475 is changed from "1" to "0". If the burst flag 475 is already "0", it does not change. After the burst flag 475 is changed from "1" to "0", the burst signal 476 is changed from on to off.

(b) Burst Length Monitoring Circuit 410

In the burst length monitoring circuit 410, the cell counter 411 counts up each time a cell arrives. As the burst signal changes from on to off, the cell counter 411 outputs the cumulative number of cells arrived during the period from the start to the end of a burst, to the delay circuit 412, square multiplier 414, and arithmetic circuit 423, and is cleared to "0".

As the cumulative number of cells is input to the delay circuit 412, the arithmetic circuit 413 calculates an average value of a plurality of sampled burst lengths stored in the delay circuit 412, and outputs this average value to the buffer threshold value adaptive control circuit as an average burst length. At the same time, the average burst length is input to the square multiplier 414.

As the cumulative number of cells is input to the square multiplier 414, a square of the cell cumulative number is input to the delay circuit 415. As the square of the cell cumulative number is input to the delay circuit 415, the arithmetic circuit 416 calculates a square average of a plurality of sampled burst lengths stored in the delay circuit 415, and outputs the square average of burst lengths to the arithmetic circuit 418. As the average burst length and square average of burst lengths are input to the arithmetic circuit 418, it obtains a value of a quotient between the square average of burst lengths and a square of the average burst length, subtracted by "1", and outputs this value to the buffer threshold value adaptive control circuit 350 as the squared coefficient of variations of burst lengths.

(c) Average Cell Rate Monitoring Circuit 420 (FIG. 21)

In the average cell rate monitoring circuit 420, as the burst signal 476 changes from off to on, the intermittent timer 421 counts up the timer counter 422 at a constant period. As the burst signal 476 changes from on to off, the timer counter 422 outputs the cumulative number therein to the arithmetic circuit 423 and clears to "0".

As the cell cumulative number and the cumulative number t in the timer counter 422 are input to the arithmetic circuit 423, the arithmetic circuit 423 calculates a quotient between the cell cumulative number of the cumulative number t in the timer counter and the cell cumulative number, and calculates an average of a plurality of sampled values stored in the delay circuit 424 to output it to the delay circuit 424 as the sampled value of the peck cell rate. As the sampled value of the peck cell rate is input to the delay circuit 424, the arithmetic circuit 425 calculates an average of a plurality of sampled peak cell rates stored in the delay circuit 424, and outputs this average to the buffer threshold value adaptive control circuit 350 as the peak cell rate.

(d) Burst Interval Monitoring Circuit 430 (FIG. 21)

In the burst interval monitoring circuit 430, as the burst signal 476 changes from on to off, the intermittent timer 431 counts up the timer counter 432 at a constant period. As the burst signal 476 changes from off to on, the timer counter 432 outputs the cumulative number therein to the delay circuit 433 and square multiplier 435, and clears to "0".

As the cumulative number of the timer counter 432 is input to the delay circuit 433, the arithmetic circuit 434 calculates an average of a plurality of sampled cumulative numbers of the timer counter stored in the delay circuit, and outputs this average to the buffer threshold value adaptive control circuit 350 as the average burst interval. At the same time, the average burst interval is input to the square multiplier 438.

As the cumulative number of the timer counter 432 is input to the square multiplier 435, it outputs a square of the cumulative number to the delay circuit 436. As the square of the cumulative number is input to the delay circuit 436, the arithmetic circuit 437 calculates a square average of a plurality of sampled cumulative numbers stored in the delay circuit 436 and outputs it to the arithmetic circuit 439. As the square of the average burst interval and the square average of burst intervals are input to the arithmetic circuit 439, the arithmetic circuit 439 calculates a value of a quotient between the square average of burst intervals and the square of the average burst interval, subtracted by "1", and outputs this value to the buffer threshold value adaptive control circuit 350 as the squared variant coefficient of burst intervals.

Figure 24:
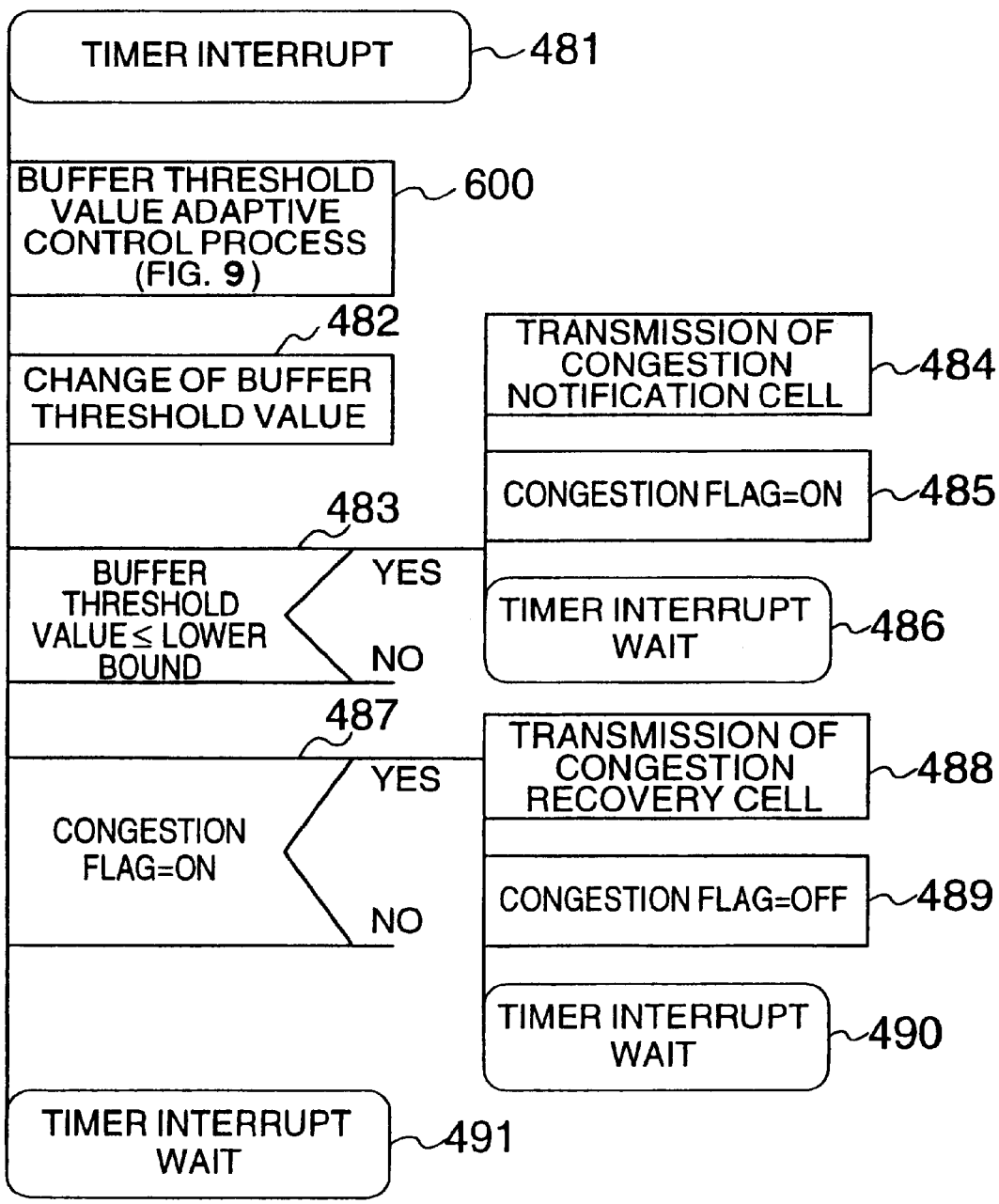
FIG. 24 is a PAD illustrating a flow rate control process to be executed by a CPU through interruption.

(3) Operation of the flow rate control process (FIG. 24)

In the CP circuit 340 shown in FIG. 20, the timer periodically interrupts CPU 141. The interrupted CPU 141 performs the flow rate control process. In FIG. 24, when the timer interrupt occurs (Step 481), the CP circuit 340 activates the buffer threshold value adaptive control circuit 350 (FIG. 19) (Step 600). The buffer threshold value adaptive control circuit 350 returns the buffer threshold value which makes the switch resources (output line capacity and buffers) have an optimum assignment relative to the present traffic characteristics of input cells. This process is the same as step 600 (FIG. 9) of the first embodiment. If the buffer threshold value returned from the buffer threshold value adaptive control circuit 350 is different from the present buffer threshold value, the buffer threshold value in the buffer threshold value memory 133 is updated via the external interface circuit 342 (Step 482).

If the buffer threshold value is lower than the knee point which is a lower bound, it is judged as an overload state (Step 483), and the congestion notification cell 13 is transmitted (Step 484). After the congestion notification cell 12 is transmitted, a congestion flag is turned on (Step 485), and the process returns to the timer interrupt wait state (Step 486).

If the buffer threshold value is the knee point or higher, it is judged whether the congestion flag is on. If the congestion flag is on, it is judged that the overload state has been released (Step 487), and the congestion recovery cell 14 is transmitted (Step 488). After the congestion recovery cell 14 is transmitted, the congestion flag is turned off (Step 489) and the flow returns to the timer interrupt wait state (Step 490).

If the congestion flag is off, the process returns to the timer interrupt wait state (Step 491).

(4) Operation of the Buffer Threshold Value Adaptive Control Circuit 350

Figure 25:
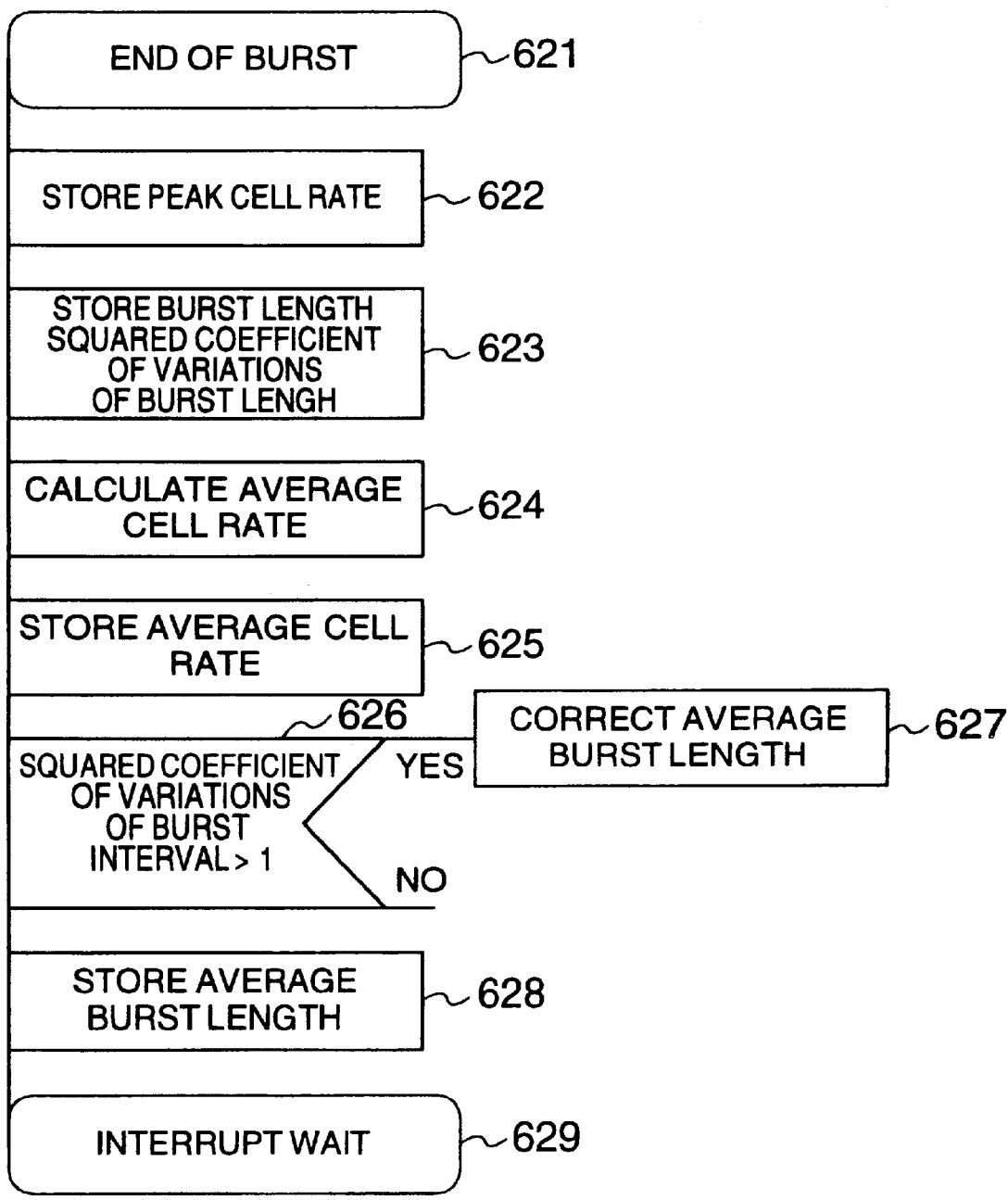
FIG. 25 is a PAD illustrating a cell monitored value post-process for correcting the monitored value of the traffic characteristics of input cells, to be executed by the buffer threshold value adaptive control circuit.
Figure 26:
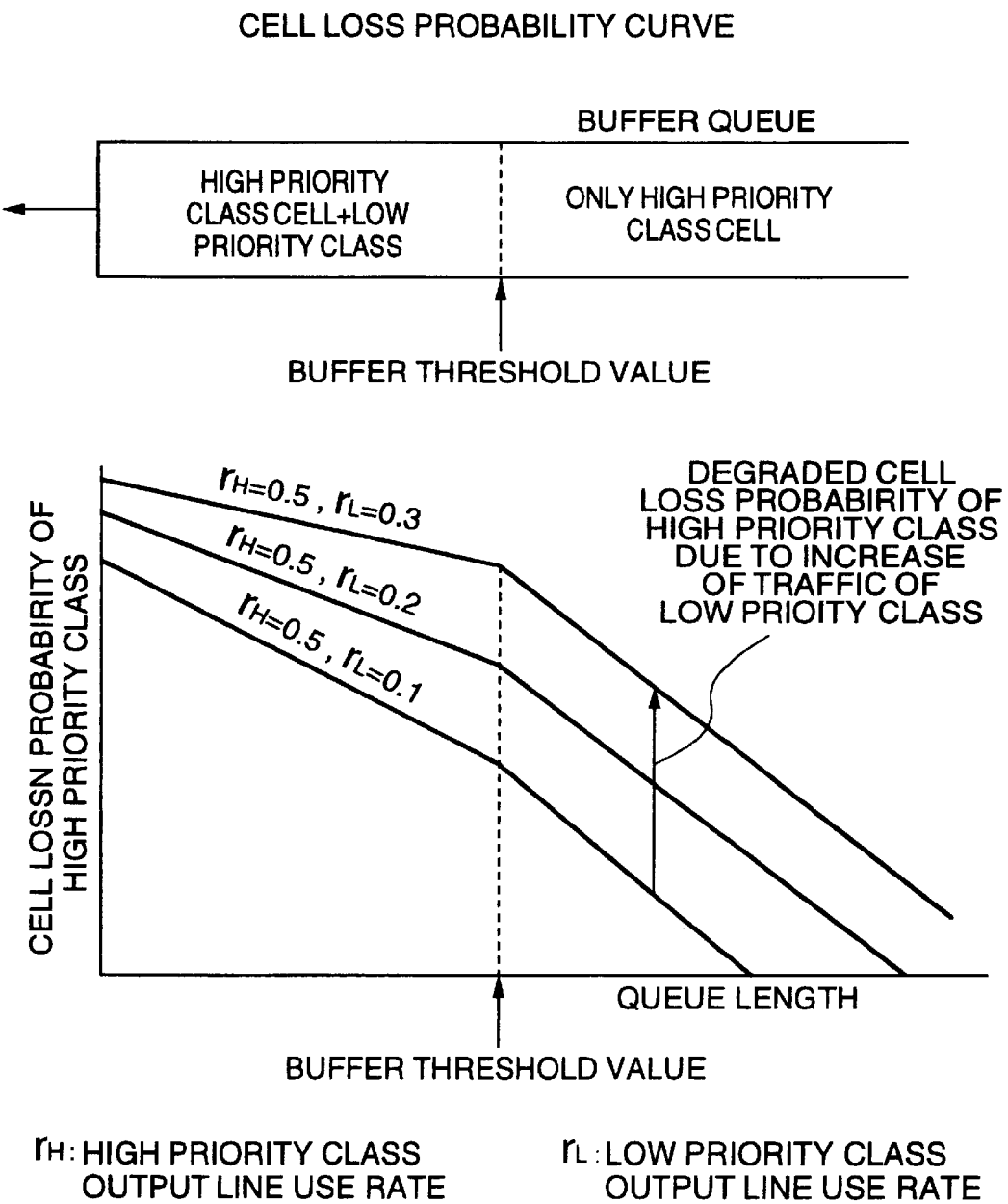
FIG. 26 shows cell loss probability distribution characteristics according to a conventional technique.
Figure 27:
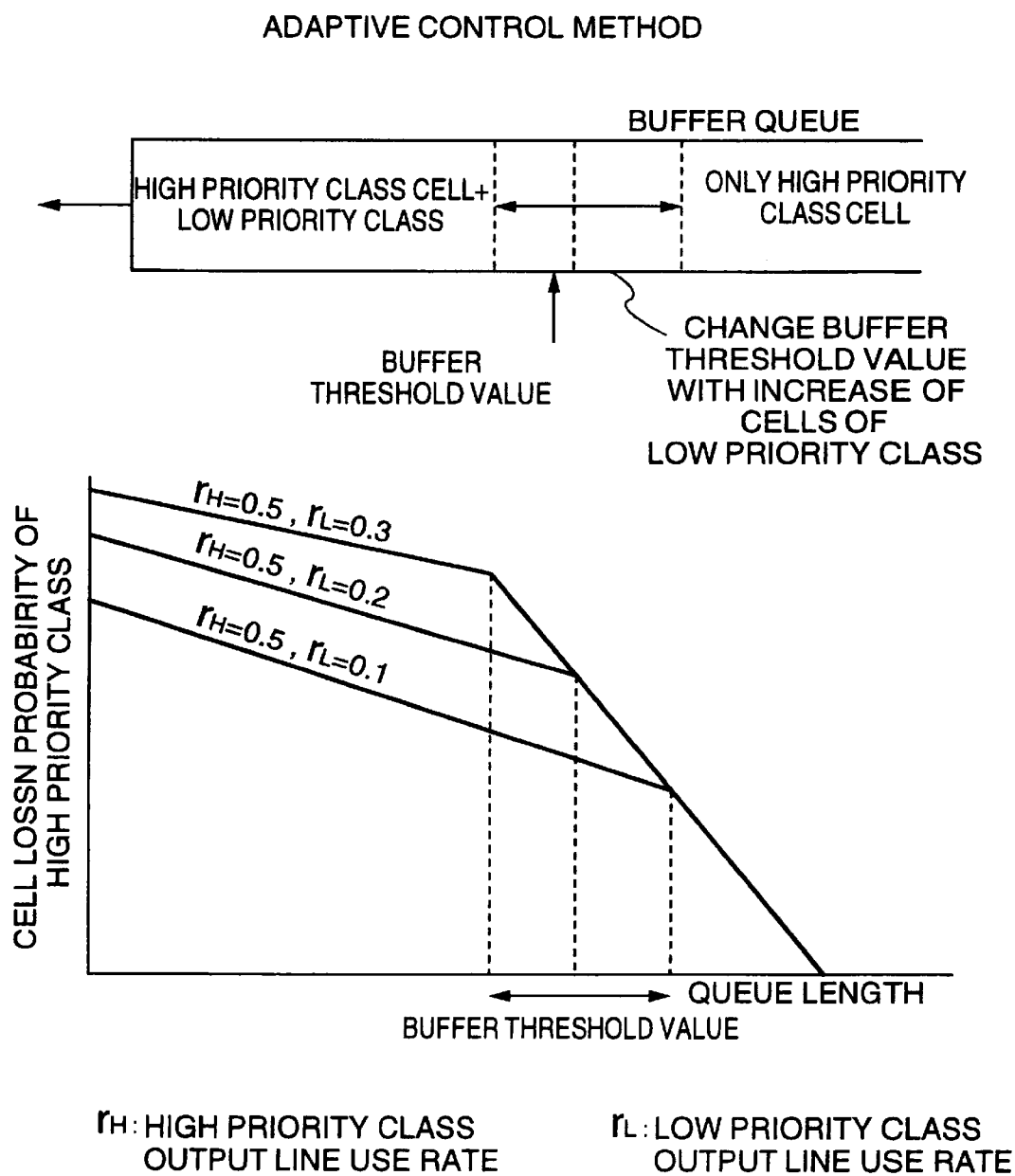
FIG. 27 shows cell loss probability distribution characteristics according to the present invention applying an adaptive control method.

(a) Post-Process of Monitored Values (FIG. 25)

Each time the burst is terminated, the buffer threshold value adaptive control circuit 350 receives the monitored values of the peak cell rate, average burst length, squared coefficient of variations of burst length, average burst interval, and squared coefficient of variations of burst interval, via the cell monitoring interface circuit 351 (FIG. 23) (Step 621).

First, the monitored value of the peak cell rate is stored in the high priority class peak cell rate memory 159 or low priority class peak cell rate memory 154 shown in FIG. 23 in accordance with the high priority (Step 622). Next, the monitored value of the squared coefficient of variations of burst length is stored in the high priority class squared coefficient of variations of burst length memory 161 or that of low priority class squared coefficient of variations of burst length memory 156 in accordance with the priority (Step 623).

Next, the average cell rate $<v_i>$ is obtained from the following equation (44) by using the monitored values $v_i$ of the peak cell rates, monitored values $(1/\mu_i)$ of average burst lengths, and monitored values $(1/\lambda_i)$ of average burst intervals (Step 624).

$$<v_i> = \frac{\lambda_i v_i}{\mu_i v_i + \lambda_i} \qquad (44)$$

The obtained average cell rate $<v_i>$ is stored in the high priority class average cell rate memory 162 or low priority class average cell rate memory 157 in accordance with the high priority (Step 625).

Lastly, it is checked whether the monitored value of squared coefficient of variations of burst interval $C_a^2$ is larger than "1" (Step 626). If larger, the monitored value of the average burst length $(1/\mu_i)$ is corrected by using the following equation (45) and the corrected value is used as the average burst length (step 627).

$$\frac{1}{\mu_i} = \frac{(1+C_a^2)}{2\mu_i} \qquad (45)$$

If not larger, the monitored value of the average burst length itself is used as the average burst length. The average burst length is stored in the high priority class average burst length memory 160 or low priority class average burst length memory 155 in accordance with the high priority (Step 628) and the process returns to the interrupt wait state (Step 629).

(b) Buffer Threshold Value Adaptive Control Process (FIG. 9)

The process is the same as the first embodiment, and so the detailed description thereof is omitted.

As described so far, in this embodiment, even if the traffic characteristics of cells change dynamically while the ATM switch 300 performs statistical multiplex, the switch resources (output line capacity and buffers) can be distributed in an optimum way through threshold value adaptive control.

According to the embodiment, in the case wherein communication services guaranteeing a cell loss probability are assigned the high priority class and best effort services are assigned the low priority class, it is possible to suppress the guaranteed cell loss probability equal to or lower than the allowable cell loss probability, because the guaranteed cell loss probability of communication services with the high priority class being assigned does not adversely affect the cell of best effort services.

What is claimed is:

1. A cell loss priority control method for an ATM switch for temporarily storing cells in a buffer of the ATM switch wherein cells are divided into a high priority class a low priority class, and if a queue length of cells in the buffer of the ATM switch exceeds a predetermined buffer threshold value, a newly arrived cell of the low priority class is discarded to store cells of the high priority class, comprising the steps of:

detecting whether traffic characteristics of the high priority class or low priority class have degraded;

estimating a distribution of cell loss probabilities at said buffer in accordance with the cell traffic characteristics;

obtaining a buffer threshold value from said estimated cell loss probability distribution, the buffer threshold value making the cell loss probability of the high priority class equal to or lower than an allowable cell loss probability; and updating the buffer threshold value.

2. A cell loss priority control method according to claim 1, wherein said buffer threshold value obtaining step includes a step of obtaining a buffer threshold value which maximizes total throughput of high priority class traffic and low priority class traffic.

3. A cell loss priority control method according to claim 2, wherein said buffer threshold value obtaining step includes a step of obtaining a buffer threshold value in accordance with a buffer length and an output line capacity respectively of the ATM switch, an allowable cell loss probability of the high priority class, and an average cell rate, a peak cell rate, an average burst length, and a squared coefficient of variations of burst length respectively of each connection after the traffic characteristics have degraded.

4. A cell loss priority control method according to claim 1, wherein said detecting step includes a step of detecting that at least one traffic of the high priority class and the low priority class is a burst traffic.

5. A cell loss priority control method for an ATM switch comprising the steps of:

receiving a call set-up cell;

obtaining a first distribution function of cell loss probabilities when cells of a high priority class and a low priority class are stored, in accordance with an average cell rater, a peak cell rate, an average or maximum value of a burst length respectively declared in said received call set-up cell, a buffer length and an output line capacity respectively of the ATM switch, said first distribution function using a buffer threshold value as its requirement;

obtaining a second distribution function of cell loss probabilities when cells of the high priority class are stored, in accordance with the average call rate, peak cell rate, average or maximum value of a burst length respectively declared in said received call set-up cell, a buffer length and an output line capacity respectively of the ATM switch, said second distribution function using the buffer threshold value as its requirement;

obtaining a buffer threshold value in accordance with said first and second distribution functions, the buffer threshold value making the cell loss probability of the high priority class after a connection request acknowledgment equal to or lower than an allowable cell loss probability; and comparing a cell loss probability of the low, priority class with said allowable cell loss probability if the obtained buffer threshold value is equal to or lower than a predetermined value establishing a connection set-up if the cell loss probability of the low priority class becomes higher than said allowable cell loss probability.

6. A cell loss priority control method according to claim 5, further comprising:

receiving a response cell from an upstream ATM switch; and changing the buffer threshold value to said newly obtained threshold value.

7. A cell loss priority control method comprising the steps of:

detecting whether traffic characteristics of a high priority class or a low priority class have degraded;

monitoring a queue length of cells in a buffer if it is detected that the traffic characteristics have degraded;

obtaining a first distribution function of cell loss probabilities when cells of the high priority class and low priority class are stored, in accordance with said monitored cell queue length, said first distribution function using a buffer threshold value as its requirement;

obtaining a second distribution function of cell loss probabilities when cells of the high priority class are stored, in accordance with said monitored cell queue length, said second distribution function using the buffer threshold value as its requirement;

obtaining a buffer threshold value in accordance with said first and second distribution functions, the buffer threshold value making the cell loss probability of the high priority class after a connection request acknowledgement equal to or lower than an allowable cell loss probability; and changing the previous buffer threshold value to said newly obtained threshold value.

8. A cell loss priority control method according to claim 7, wherein said step of detecting degradation of the traffic characteristics includes a step of detecting a state of the traffic characteristics of the low priority class formed by UPC specifications as per CCITT Recommendation I.311, 1990.

9. A cell loss priority control method according to claim 7, wherein said step of detecting degradation of the traffic characteristics includes a step of detecting a state of the traffic characteristics of the low priority class formed by best effort services specifications.

10. A cell loss priority control method comprising the steps of:

detecting whether traffic characteristics of a high priority class or a low priority class have degraded;

monitoring an average cell rate, a peak cell rate, an average burst length, and a burst length variance respectively of each connection if it is detected that the traffic characteristics have degraded;

obtaining a first distribution function of cell loss probabilities when cells of the high priority class and low priority class are stored, in accordance with said monitored said average cell rate, peak cell rate, average burst length and variance of burst length, and a buffer length and an output line capacity respectively of the ATM switch, said first distribution function using a buffer threshold value as its requirement;

obtaining a second distribution function of cell loss probabilities when cells of the high priority class are stored, in accordance with monitored said average cell rate, peak cell rate, average burst length and variance of burst length, and a buffer length and an output line capacity respectively of the ATM switch, said second distribution function using the buffer threshold value as its requirement;

obtaining a buffer threshold value in accordance with said first and second distribution functions, the buffer threshold value making the cell loss probability of the high priority class equal to or lower than an allowable cell loss probability; and updating the previous buffer threshold value to said newly obtained threshold value.

11. A cell loss priority control method according to claim 10, wherein said step of detecting degradation of the traffic characteristics includes a step of detecting a state of the traffic characteristics of the low priority class formed by best effort services specifications.

12. A cell loss priority control method for an ATM switch having a cell loss priority control function using a buffer threshold value, comprising the steps of:

obtaining a distribution function $f(x)$ of cell loss probabilities when cells of the high priority class and low priority class are stored, said distribution function $f(x)$ using a buffer threshold value as its requirement;

obtaining a distribution function g(x) of cell loss probabilities when cells of the high priority class are stored, said distribution function g(x) using the buffer threshold value as its requirement; and obtaining a buffer threshold value in accordance with said distribution functions f(x) and g(x), the buffer threshold value assigning a buffer capacity and an output line capacity of the ATM switch to the high priority class and low priority class in an optimum way.

13. A cell loss probability evaluation method for cell loss priority control for an ATM switch having a cell loss priority control function using a buffer threshold value, comprising:

a first step of obtaining a sum of average cell rates and a sum of peak cell rates for respective connections of both a high priority class a low priority class;

a second step of obtaining a first effective average burst length in accordance with said average cell rate and peak cell rate, said first effective average burst length being an average of quantities of (an average survival time of burst lengths) {1 average cell rate)/(peak cell rate)} for all connections of both the high priority class and low priority class;

a third step of obtaining a sum of average cell rates and a sum of peak cell rates of traffic at each connection of the high priority class;

a fourth step of obtaining a second effective average burst length in accordance with said average cell rate and peak cell rate of traffics at each connection, said second effective average burst length being an average of quantities of (an average survival time of burst lengths) {1−(average cell rate)/(peak cell rate)} for all connections of the high priority class; and a fifth step of obtaining cell loss probability distribution functions of both the high priority class and low priority class.

14. An ATM switch comprising:

buffer means for temporarily storing cells;

switch means for switching between paths in accordance with a destination of each cell;

memory means for storing a buffer threshold value as a cell discard reference;

control means for instructing said switch means to discard a cell or not in accordance with said buffer threshold value;

means for detecting whether traffic characteristics of a high priority class or a low priority class have degraded;

means for estimating a distribution of cell loss probabilities at said buffer means in accordance with the cell traffic characteristics;

means for obtaining a buffer threshold value making the cell loss probability of the high priority class equal to or lower than an allowable cell loss probability, in accordance with said estimated cell loss probability distribution; and means for updating said buffer threshold value.

15. An ATM switch according to claim 14, wherein said buffer threshold value obtaining means includes means for obtaining a buffer threshold value which maximizes total throughput of high priority class traffic and low priority class traffic.

16. An ATM switch according to claim 15, wherein said buffer threshold value obtaining means includes means for obtaining a buffer threshold value in accordance with a buffer length and an output line capacity respectively of the ATM switch, an allowable cell loss probability of the high priority class, and an average cell rate, a peak cell rate, an average burst length and a squared coefficient of variations of burst length respectively of each connection after the traffic characteristics have degraded.

17. An ATM switch according to claim 14, wherein said detecting means includes means for detecting that at least one traffic of the high priority class and the low priority class is a burst traffic.

18. An ATM switch according to claim 14, wherein said estimating means includes:

means for obtaining a distribution function f(x) of cell loss probabilities when cells of the high priority class and low priority class are stored, in accordance with the traffic characteristics of both the high priority class and low priority class; and means for obtaining a distribution function g(x) of cell loss probabilities when cells of the high priority class are stored, in accordance with the traffic characteristics of the high priority class, wherein said buffer threshold value obtaining means includes means for obtaining a buffer threshold value in accordance with said distribution functions f(x) and g(x), the buffer threshold value assigning a buffer capacity and an output line capacity of the ATM switch to the high priority class and low priority class in an optimum way.

19. An ATM switch according to claim 14, wherein said detecting means includes means for judging from the contents of a traffic descriptor in a call set-up request cell whether the traffic characteristics have degraded.

20. An ATM switch according to claim 14, wherein said estimating means includes:

means for estimating a distribution of cell loss probabilities when cells of both the high priority class and low priority class are stored and a distribution of cell loss probabilities when cells of the low priority class are stored, in accordance with a monitored value of a cell queue length.

21. An ATM switch according to claim 14, wherein said estimating means includes:

means for monitoring an average cell rate, a peak cell rate, average burst length and variance of burst length, and average burst interval and variance of burst interval respectively at each connection of an input cell; and means for estimating a distribution of cell loss probabilities in accordance with said average cell rate, peak cell rate, average burst length and variance of burst length, and average burst interval and variance of burst interval.

* * * * *